(12) United States Patent
Nozoe et al.

(10) Patent No.: US 6,912,901 B1
(45) Date of Patent: *Jul. 5, 2005

(54) ANGULAR VELOCITY SENSOR

(75) Inventors: Toshiyuki Nozoe, Kyoto (JP); Takeshi Uemura, Osaka (JP); Masami Tamura, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 13 days.

This patent is subject to a terminal disclaimer.

(21) Appl. No.: 10/614,025

(22) Filed: Jul. 8, 2003

Related U.S. Application Data

(60) Division of application No. 09/811,786, filed on Mar. 20, 2001, now Pat. No. 6,705,151, which is a continuation-in-part of application No. 09/332,162, filed on Jun. 14, 1999, now Pat. No. 6,244,095, which is a division of application No. 08/776,443, filed as application No. PCT/JP96/01445 on May 29, 1996, now Pat. No. 5,939,630.

(30) Foreign Application Priority Data

| May 30, 1995 | (JP) | ................................... 7-131351 |
| Apr. 9, 1996 | (JP) | ................................... 8-086189 |

(51) Int. Cl.$^7$ .......................................... G01C 9/04
(52) U.S. Cl. ............................ 73/504.12; 73/504.16; 73/1.77
(58) Field of Search ......................... 73/504.12, 504.16, 73/504.02, 504.04, 1.37, 1.77, 1.82, 504.15, 73/504.14

(56) References Cited

U.S. PATENT DOCUMENTS

| 4,671,112 A | 6/1987 | Kimura et al. |
| 5,131,273 A | 7/1992 | Tabata et al. |
| 5,293,779 A | 3/1994 | Nakamura et al. |
| 5,426,970 A | 6/1995 | Florida et al. |
| 5,447,066 A | 9/1995 | Terada et al. |
| 5,942,686 A | 8/1999 | Bhardwaj |
| 6,089,091 A | 7/2000 | Nozoe et al. |
| 6,244,095 B1 * | 6/2001 | Nozoe et al. ................. 73/1.82 |
| 6,418,790 B1 | 7/2002 | Yukawa et al. |
| 6,732,586 B2 * | 5/2004 | Nozoe et al. ............ 73/504.12 |

FOREIGN PATENT DOCUMENTS

| EP | 0 462 580 | 12/1991 |
| EP | 0 638 782 B1 | 2/1995 |
| EP | 0 702 207 B1 | 3/1996 |
| EP | 0 773 430 | 5/1997 |

(Continued)

*Primary Examiner*—Helen C. Kwok
(74) *Attorney, Agent, or Firm*—McDermott Will & Emery LLP

(57) ABSTRACT

The present invention aims to present an angular velocity sensor having a self diagnosis function.

An angular velocity sensor of the present invention includes a driving part for stably vibrating a driving part of a sensor element having a driver part and a detector part for detecting an angular velocity and detection means for detecting the angular velocity of the sensor element and obtains a self diagnosis signal for a malfunction by detecting a mechanical coupling signal obtained at the detection means.

11 Claims, 33 Drawing Sheets

FOREIGN PATENT DOCUMENTS

| | | |
|---|---|---|
| EP | 1 031 814 | 8/2000 |
| JP | 64-15911 | 1/1989 |
| JP | 3-226620 | 10/1991 |
| JP | 4-215017 | 8/1992 |
| JP | 04-295716 | 10/1992 |
| JP | 04-297874 | 10/1992 |
| JP | 6-18267 | 1/1994 |
| JP | 7-77538 | 3/1995 |
| JP | 7-181042 | 7/1995 |
| JP | 8-178945 | 7/1996 |
| JP | 09-105637 | 4/1997 |
| JP | 10-073437 | 3/1998 |

* cited by examiner

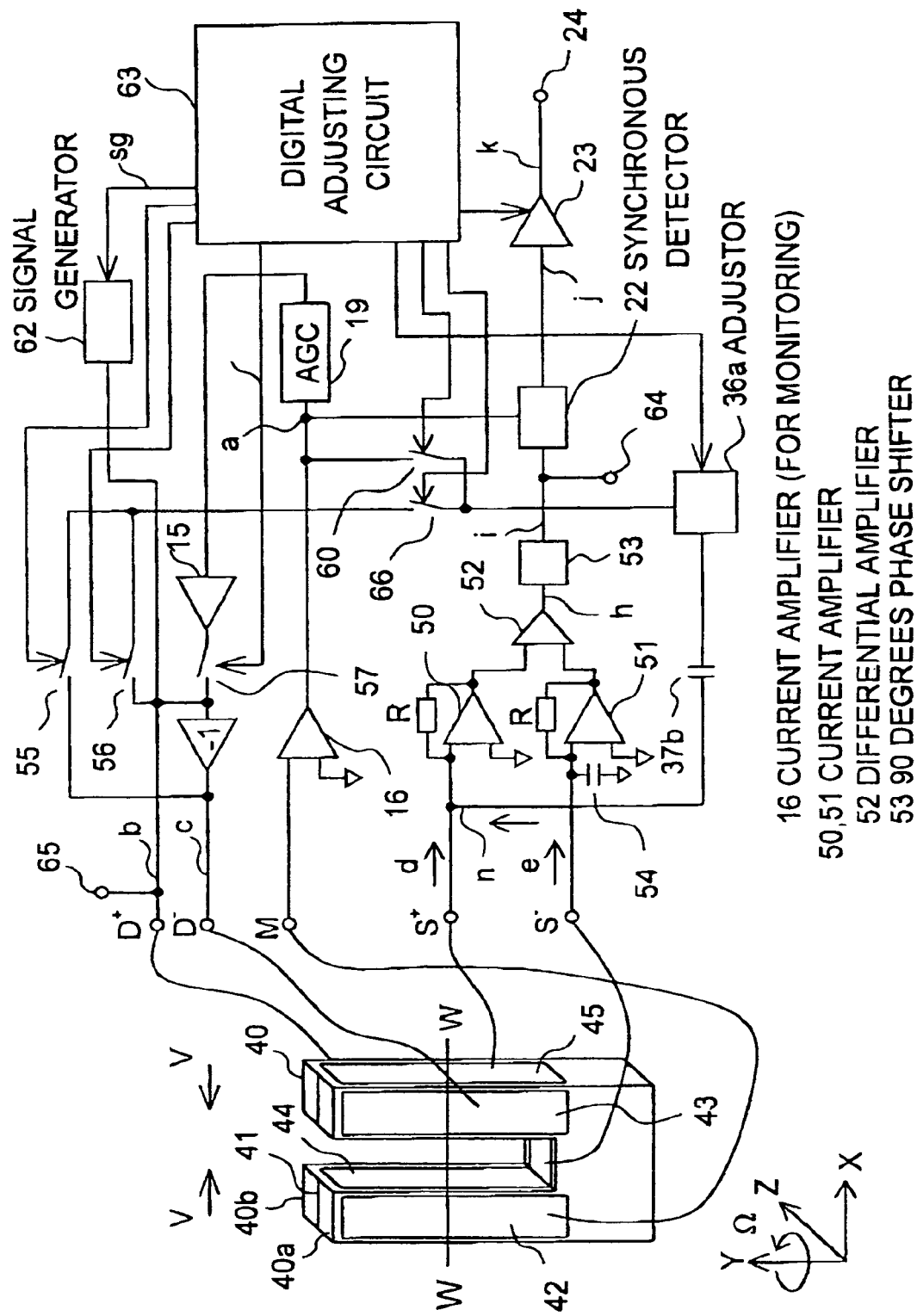

ANGULAR VELOCITY SENSOR

CROSS-REFERENCE TO RELATED APPLICATIONS

This application is a divisional of application Ser. No. 09/811,786 filed Mar. 20, 2001 now U.S. Pat. No. 6,705,151 which is a continuation-in-part of application Ser. No. 09/332,162 filed Jun. 14, 1999 now U.S. Pat. No. 6,244,095 which is a divisional of application Ser. No. 08/776,443 filed Apr. 17, 1997 now U.S. Pat. No. 5,939,630 which is a 371 application of PCT/JP96/01445 filed May 29, 1996.

FIELD OF THE INVENTION

The present invention relates to an angular velocity sensor having a self diagnosis function.

BACKGROUND OF THE INVENTION

A conventional tuning fork type angular velocity sensor has a detecting part comprising detector plates 13 and 14 and a driving part comprising driver plates 11 and 12. As shown in FIG. 19, detector plates 13 and 14 are located at the top of the driver plates 11 and 12, respectively. Each detector plate 13 and 14 is joined orthogonally to a respective driver plate 13 and 14. When an angular velocity is applied to the angular velocity sensor and while keeping the driving part in continuous tuning fork vibration, the angular velocity is detected by the output of the detector plates 13 and 14, which vibrate in opposite directions to each other corresponding to the applied angular velocity.

In an angular velocity sensor in accordance with the prior art, a tightly sealed space is formed by a lid 2, which is made of resin. Lid 2 is attached at an aperture of a case 1, also made of resin, of which one end is open, as shown in FIG. 18.

Inside the tightly sealed space, a circuit board 3 and a metallic weight plate 4 are contained. Supporting pins 5 are attached at four corners inside the case 1, and weight plate 4 and circuit board 3 are elastically supported and fixed by the supporting pins 5. Dampers 6 made of rubber are attached at the four corners of weight plate 4 for the elastic support. Supporting legs 7 made of resin are put between damper 6 and circuit board 3. Supporting pins 5 are compressed at the tips toward the circuit board 3 side after penetrating dampers 6, supporting legs 7 and circuit board 3. Thus, circuit board 3 and weight plate 4 are elastically supported and fixed. A metallic supporting pin 8 is inserted and fixed vertically to weight plate 4, on the circuit board 3 side, as shown in FIG. 19. One end of a metallic supporting pin 9, laid parallel to weight plate 4, is inserted and fixed to supporting pin 8. The diameter of supporting pin 9 is about one fifth of the diameter of supporting pin 8. Furthermore supporting pin 9 is made of metallic material having elasticity, such as a piano wire, wherein the other end of supporting pin 9 is fixed to a metal plate 10 by soldering.

One end of each of metallic driver plates 11 and 12, which are sandwiching supporting pins 8 and 9 therebetween, is fixed to each side of metal plate 10. Plate-shaped piezoelectric elements 11a and 12a are fixed on the surfaces of metallic driver plates 11 and 12, respectively. In this way, the tuning fork type driving part is formed. The other ends of driver plates 11 and 12 are twisted orthogonally relative to piezoelectric elements 11a and 12a to form detector plates 13 and 14. Other plate-shaped piezoelectric elements 13a and 14a are fixed on detector plates 13 and 14, as shown in FIG. 19. In this way, the detecting part is formed. The angular velocity sensor is composed of the driving part and the detecting part.

There is a problem with the conventional angular velocity sensor however. Namely, the conventional sensor has no ability to detect information about the occurrence of a malfunction of the components, nor the ability to send such information, judged to be a malfunction of the components, to the outside (e.g., such that an operator can be notified of the malfunction).

The present invention provides a sensor that allows detection from outside the sensor of a malfunction in the sensor, resulting from partial damage to the sensor, that prevents the sensor from performing accurate angular velocity detection. Accordingly, the present invention provides a highly reliable angular velocity sensor.

SUMMARY OF THE INVENTION

To achieve the stated purpose, an angular velocity sensor of the present invention includes (1) a sensor element having a driver part and a detector part for detecting an angular velocity, (2) drive means including a driver circuit for supplying a driving signal to the driving part of the sensor element and a monitor circuit to which a monitor signal is supplied from the sensor element and stably driving and vibrating the driver part of the sensor element by applying the output of the monitor circuit to the driver circuit through an AGC (automatic gain control) circuit, (3) detection means including a charging amplifier to which an output of the detector part of the sensor element is supplied and a synchronous detector to which an output of the charging amplifier is supplied through a band pass filter and detecting an output of the band pass filter synchronizing with a driving signal from the drive means and outputting an angular velocity signal, and (4) self diagnosis means receiving a mechanical coupling signal obtained from the detection means other than an angular velocity signal, detecting abnormality of the sensor element and outputting a self diagnosis signal.

Also, an angular velocity sensor according to another aspect of the present invention includes, (1) a sensor element with a vibrating part and detector part for detecting an angular velocity, (2) drive means including a driver circuit and a monitor circuit similar to that mentioned above, (3) detection means including a pair of current amplifiers, a differential amplifier and a synchronous demodulator, in which the pair of current amplifiers receive outputs from the detector part of said sensor element, the differential amplifier amplifies a difference in outputs from the pair of current amplifiers and in which the synchronous demodulator detects an output from the differential amplifier in synchronous with the driving signal from the drive means and outputs an angular velocity signal, and (4) self diagnosis means for outputting a diagnosis signal to detect an abnormality of the sensor element by coupling a signal synchronized with the driving signal to the synchronous demodulator.

According to the above composition, by making the mechanical coupling signal always obtained from the detection means as a signal for self diagnosis, whether the angular velocity signal is in a state to be detected normally or not can be easily checked. Also as the mechanical coupling signal is always generated, it is unnecessary to independently provide means for generating the mechanical coupling signal. Accordingly, not only is the composition very simple and highly reliable for self diagnosis, but it also makes it possible to know when the characteristics of the sensor become stable after the sensor starts to work so that sensor output information can be utilized at its earliest possible time.

BRIEF DESCRIPTION OF THE DRAWINGS

FIG. 11(*b*) is a cross sectional view of the essential part of the angular velocity sensor of FIG. 9.

FIG. 11(*c*) is an equivalent circuit diagram of the angular velocity sensor of FIG. 9.

FIG. 20(*b*) shows a cross-sectional view of the angular velocity sensor of FIG. 20(*a*) taken across W—W.

FIG. 20(*c*) shows a detailed current distribution in the W—W cross-section of FIG. 20(*b*).

FIG. 26(*b*) shows a detailed current distribution in the W—W cross-section illustrated in FIG. 26(*a*).

FIG. 28(*b*) shows a cross-sectional view of the angular velocity sensor of FIG. 28(*a*) taken across W—W.

FIG. 29(*b*) shows waveforms at various points of the angular velocity sensor of FIG. 28(*a*) during an adjusting operation.

FIG. 29(*c*) shows waveforms at various points of the angular velocity sensor of FIG. 28(*a*) after an adjusting operation.

DETAILED DESCRIPTION OF THE INVENTION

First Exemplary Embodiment

Figure 1:
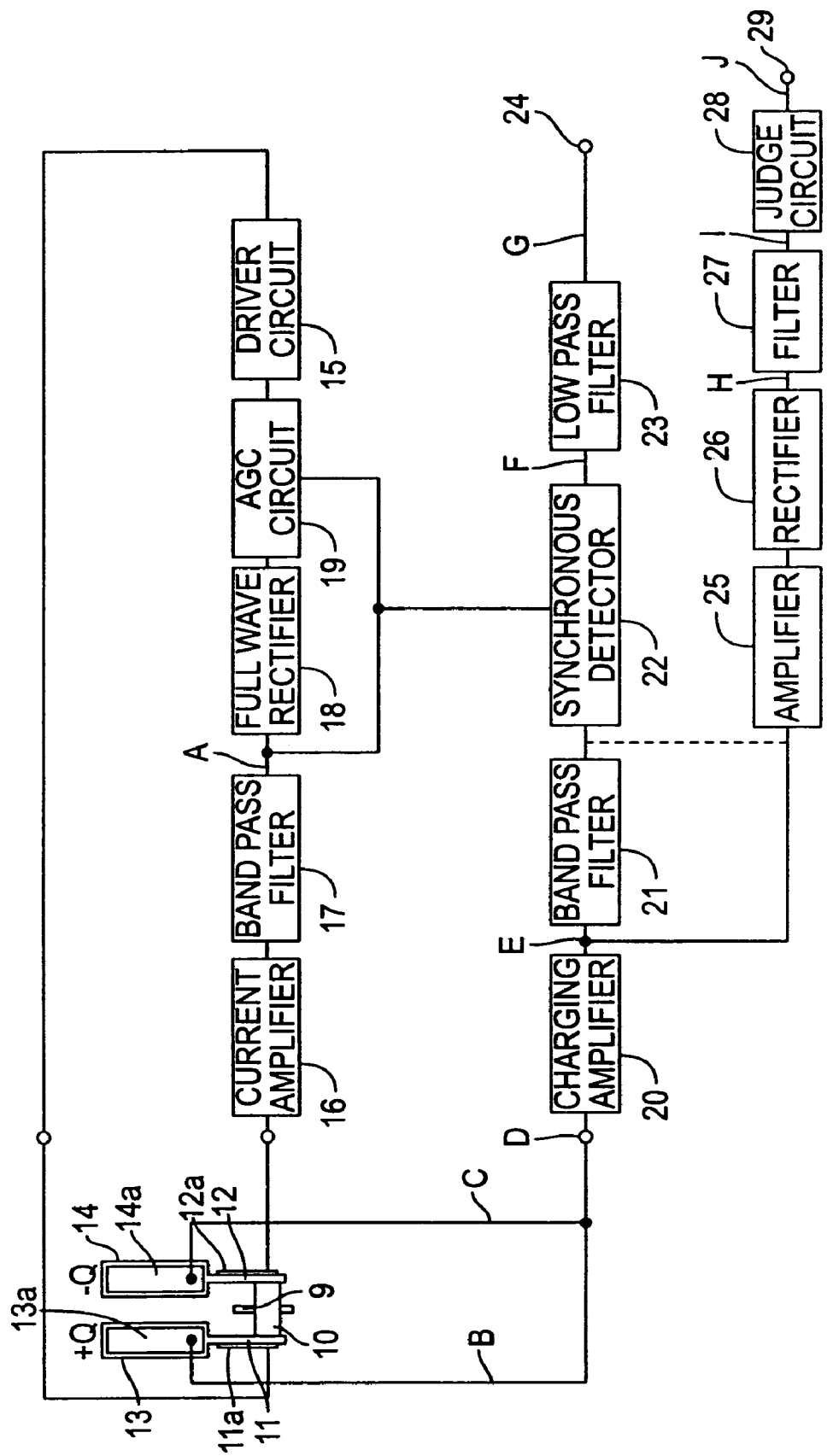
FIG. 1 is a block diagram of an angular velocity sensor in accordance with a first exemplary embodiment of the present invention.

FIG. 1 is a circuit diagram of an angular velocity sensor in accordance with a first exemplary embodiment of the present invention. An AC signal of about 1 Vp-p and 1.5 kHz is applied to a piezoelectric element 11*a* of a driver plate 11 from a driver circuit 15. Accordingly, driver plates 11 and 12 start a tuning fork vibration inward and outward against a supporting pin 9 as a center. A voltage proportional to the applied signal is induced at a piezoelectric element 12*a* of a driver plate 12 by the tuning fork vibration and becomes a monitor signal shown as waveform A in FIG. 2 (corresponding to point A in FIG. 1), after passing a current amplifier 16 and a band pass filter 17. This signal is fed back to the driver circuit 15 through a full wave rectifier 18 and an AGC circuit 19 and thus a driving signal is automatically controlled in its amplitude.

Figure 2:
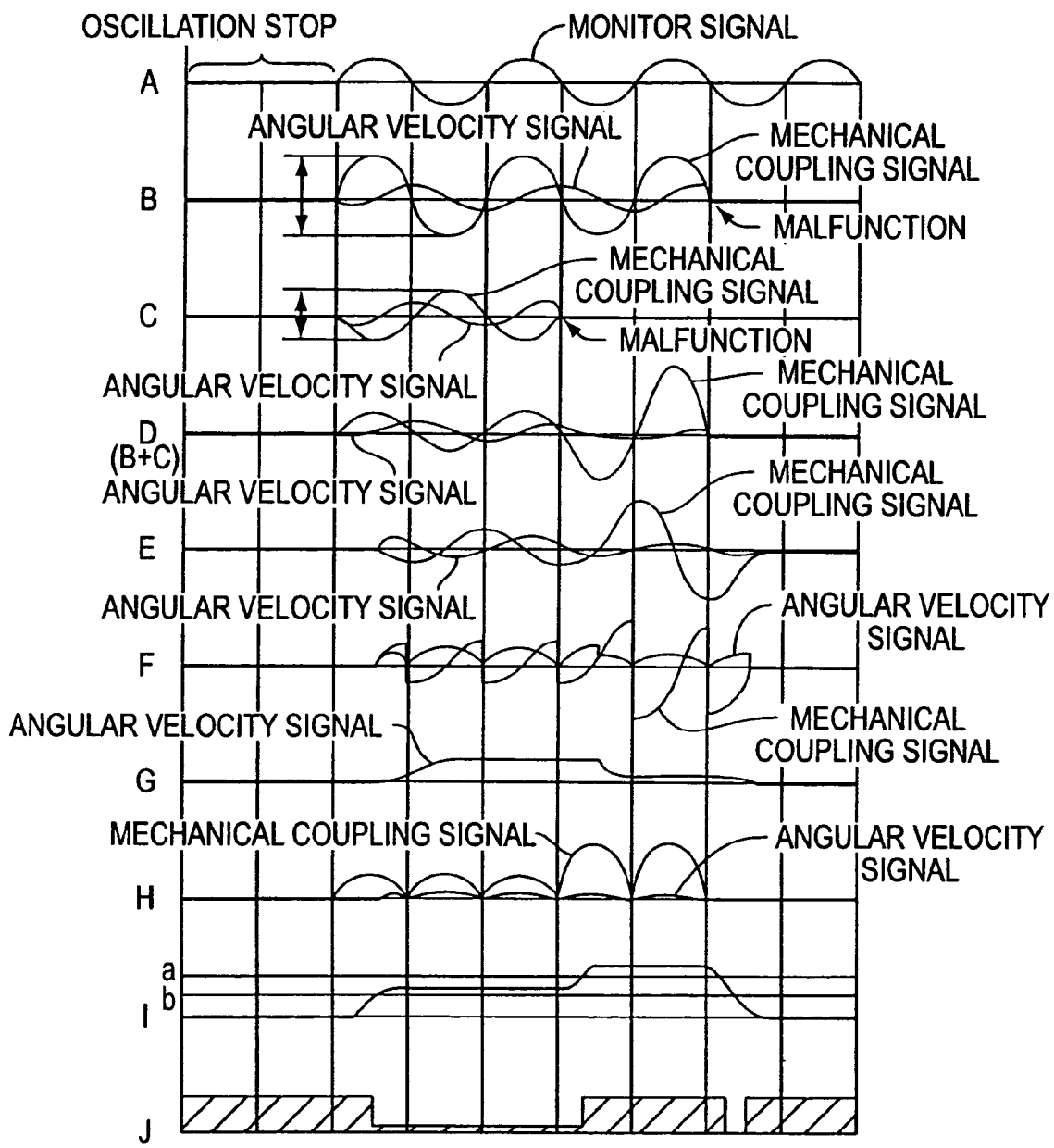
FIG. 2 shows waveforms at various points of the angular velocity sensor of FIG. 1.

In the detecting part of the sensor, when piezoelectric elements 13*a* and 14*a* detect an angular velocity, both piezoelectric elements 13*a* and 14*a* output angular velocity signals of +Q. These angular velocity signals are shown in FIG. 2 as waveforms B and C, respectively. These angular velocity signals are then synthesized at point D, shown in FIG. 1, thus becoming an angular velocity signal shown in FIG. 2 as waveform D. Angular velocity signal D is outputted from an output terminal 24 after passing through a charging amplifier 20, a band pass filter 21, a synchronous detector 22 and a low pass filter 23. The angular velocity signals at points E, F and G shown in FIG. 1 are shown in FIG. 2 as waveforms E, F and G, respectively.

In the exemplary embodiment, although detector plates 13 and 14 have to be set orthogonally relative to driver plates 11 and 12, it is essentially difficult to put them in true orthogonal directions and moreover it is impossible to make piezoelectric elements 13a and 14a exactly the same in size and attaching configuration to detector plates 13 and 14. As a result, piezoelectric elements 13a and 14a always generate mechanical coupling signals, shown in FIG. 2 as waveforms B and C, other than the angular velocity signals described above. In this case, piezoelectric elements 13a and 14a are pasted on the same side surfaces of detector plates 13 and 14 and the centers of gravity of detector plates 13 and 14 deviate a little toward the sides with piezoelectric elements 13a and 14a. Therefore, when driver plates 11 and 12 make a tuning fork vibration, for example when they open outward, they open leaning toward the sides of piezoelectric elements 13a and 14a. Accordingly, mechanical coupling signals generated at piezoelectric elements 13a and 14a are in a reciprocal phase as shown in FIG. 2 as waveforms B and C. Therefore, when the mechanical coupling signals are synthesized at point D shown in FIG. 1, the synthesized mechanical coupling signal becomes small. The synthesized mechanical coupling signal is amplified at a charging amplifier 20 and an amplifier 25, rectified at a rectifier 26 and then the signal level is judged at a judge circuit 28 and the judged result is outputted from a signal output terminal 29. The signals at points H, I and J shown in FIG. 1 are shown in FIG. 2 as waveforms H, I and J, respectively. When signal I outputted from filter 27 is between level "a" and level "b", the output of judge circuit 28 is in a low level as shown in FIG. 2 as waveform J and is outputted from terminal 29.

When, for example, detector plate 14 shown in FIG. 1 is damaged or its lead wire is broken, both the angular velocity signal and the mechanical coupling signal from piezoelectric element 14a become zero after the malfunction, as shown in FIG. 2 as waveform C. As a result, only a mechanical coupling signal from piezoelectric element 13a appears at point D shown in FIG. 1, and it becomes a much larger mechanical coupling signal than when detector plate 14 was not damaged or its lead wire was not broken. Therefore, the output of filter 27 becomes larger than level "a" shown in waveform I of FIG. 2 and a high level signal is outputted from judge circuit 28 as shown in FIG. 2 as waveform J. When both detector plates 13 and 14 are damaged or both lead wires are broken, the output of filter 27 becomes smaller than level "b" shown in waveform I of FIG. 2 and a high level signal is also outputted from judge circuit 28 as shown in FIG. 2 as waveform J. When such a high level signal is outputted, information that the angular velocity sensor is malfunctioning is transmitted.

Second Exemplary Embodiment

Figure 3:
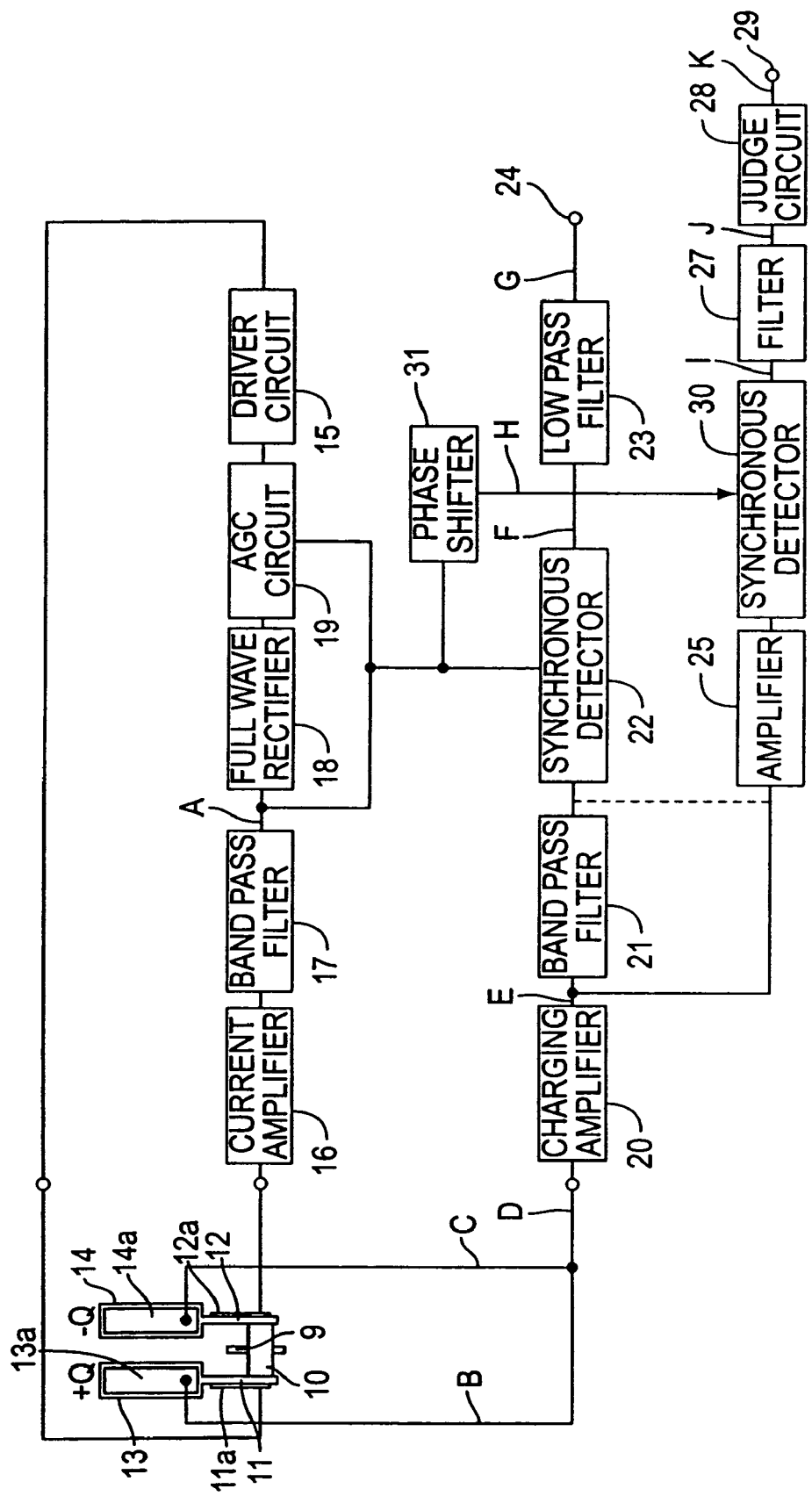
FIG. 3 is a block diagram of an angular velocity sensor in accordance with a second exemplary embodiment of the present invention.

FIG. 3 is a circuit diagram of an angular velocity sensor in accordance with a second exemplary embodiment of the present invention. In this exemplary embodiment, a synchronous detector 30 is inserted between amplifier 25 and filter 27. A synchronous detection is executed by using a feedback signal from the feedback circuit of a driving signal. Such a feedback signal is a phase shifted signal from the signal at point A through phase shifter 31 shown in FIG. 3. In other words, because the mechanical coupling signal flowing into amplifier 25 contains an angular velocity signal, the level of the mechanical coupling signal is brought close to a correct value by canceling the angular velocity signal.

Figure 4:
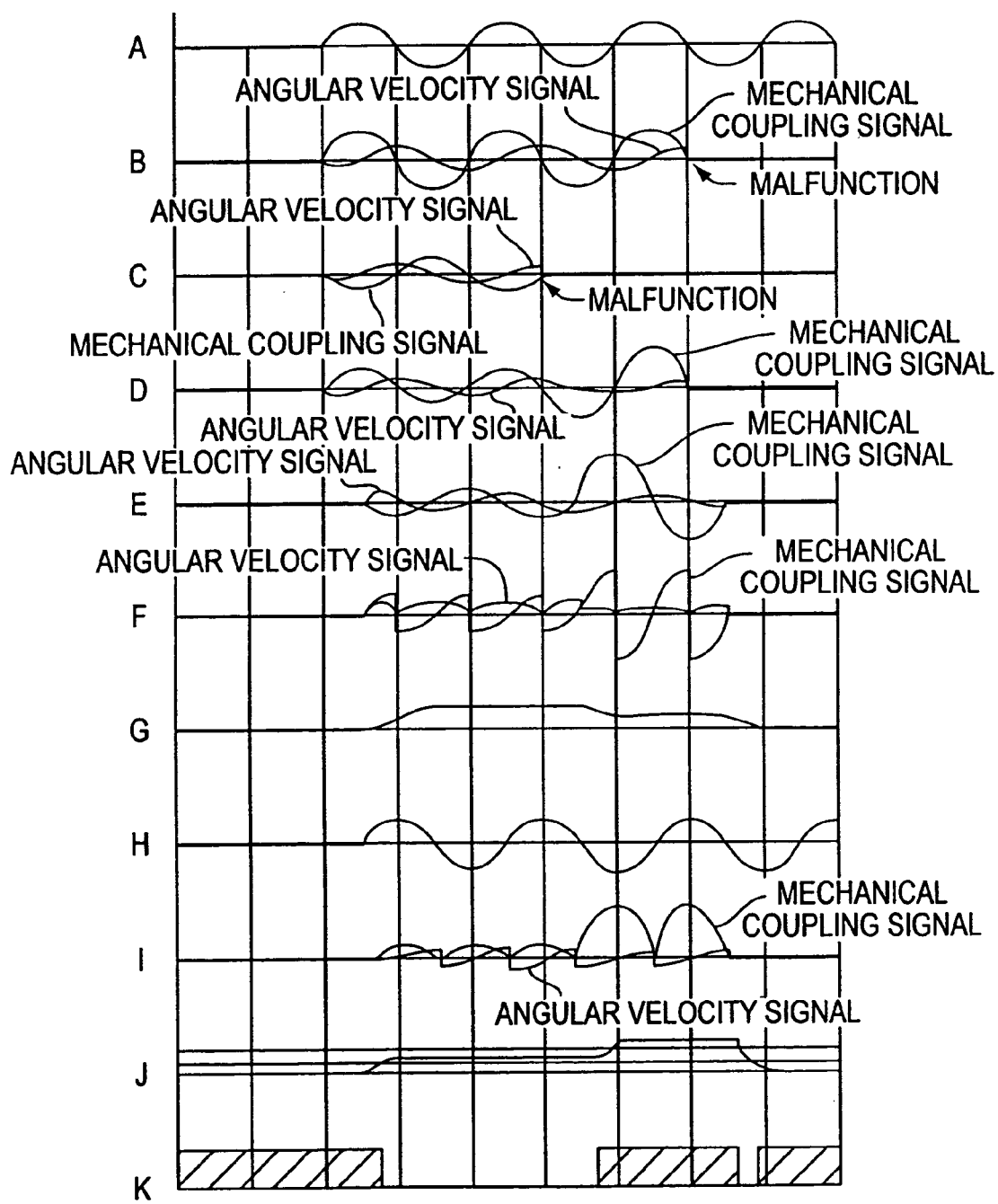
FIG. 4 shows waveforms at various points of the angular velocity sensor of FIG. 3.

The signal shown in FIG. 4 as waveform A flowing at point A shown in FIG. 3 is delayed by 90 degrees at phase shifter 31. If the output from amplifier 25 is detected to be synchronized with a signal H delayed by 90 degrees (shown in FIG. 4 as waveform H), the angular velocity signal is canceled as shown in FIG. 4 as waveform 1. Therefore, it is possible to bring the mechanical coupling signal level inputted to filter 27 close to a correct value.

Third Exemplary Embodiment

Figure 5:
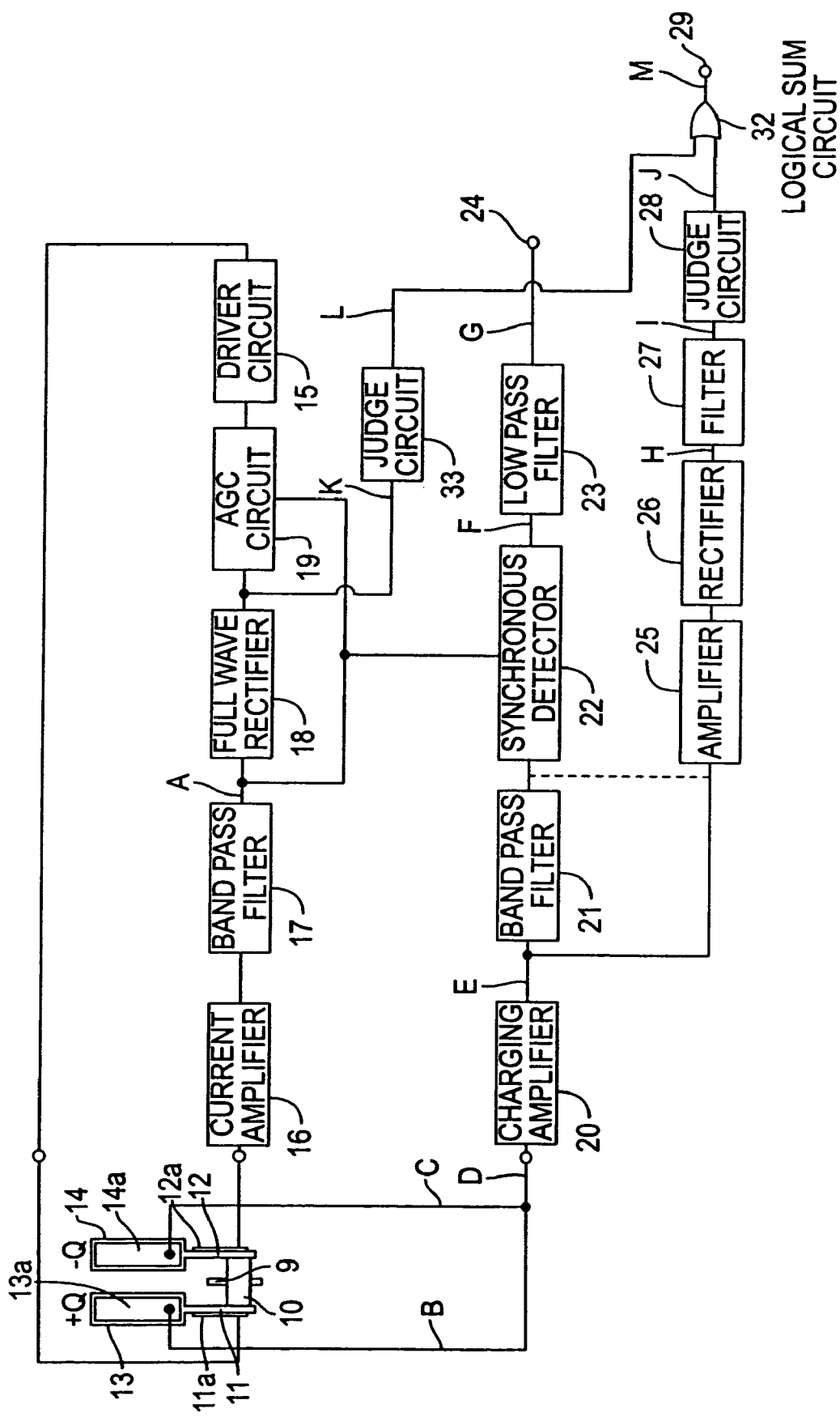
FIG. 5 is a block diagram of an angular velocity sensor in accordance with a third exemplary embodiment of the present invention.
Figure 6:
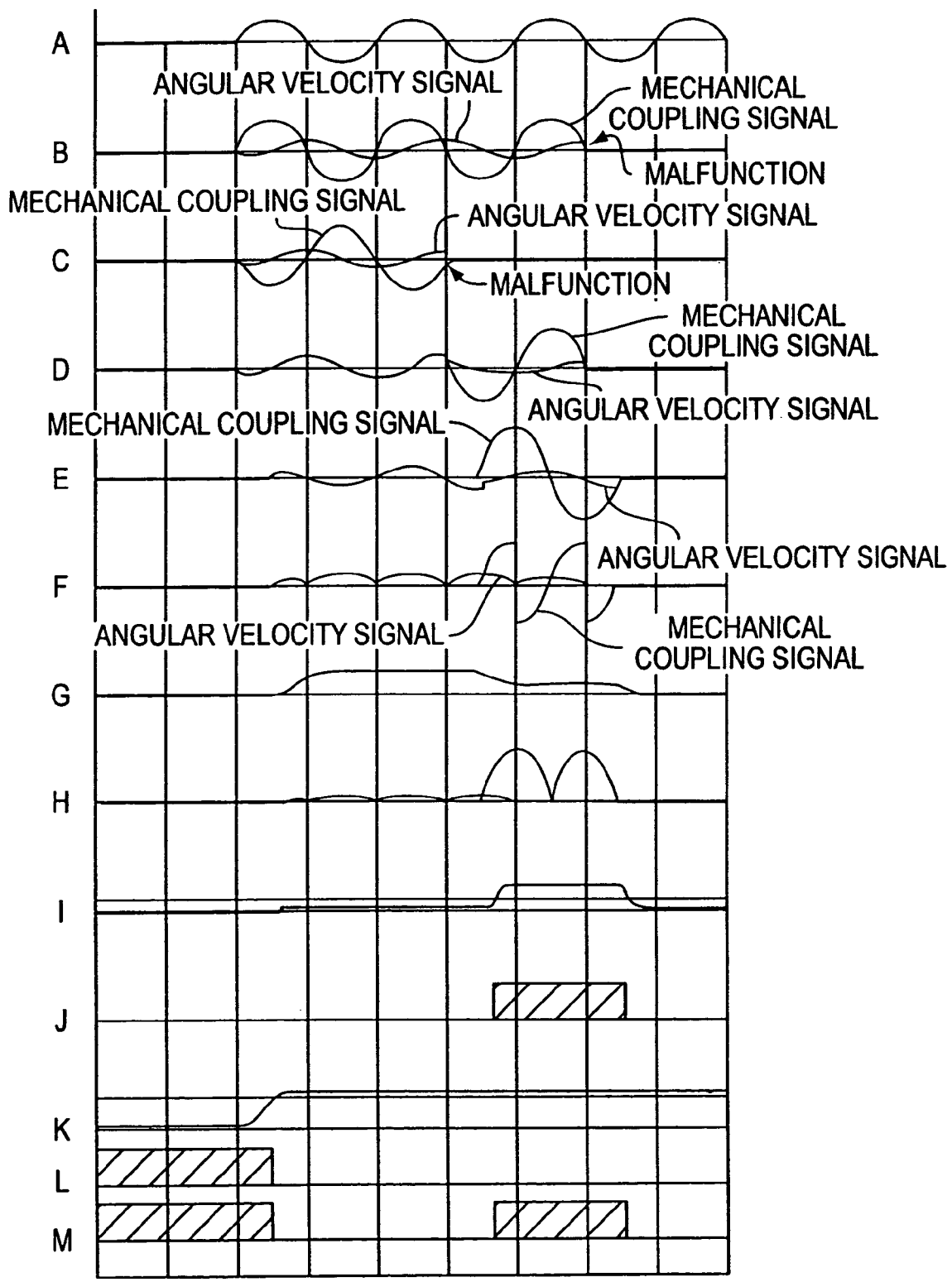
FIG. 6 shows waveforms at various points of the angular velocity sensor of FIG. 5.

FIG. 5 is a circuit diagram of an angular velocity sensor in accordance with a third exemplary embodiment of the present invention. In this exemplary embodiment, when the mechanical coupling signals outputted from piezoelectric elements 13a and 14a are added at point D, shown in FIG. 5, the sum is made to be zero as an initial setting. While the sums are not zero in the first and second exemplary embodiments, in the third exemplary embodiment, the sum of the mechanical coupling signals outputted from piezoelectric elements 13a and 14a is made zero by trimming either detector plate 13 or 14 at the initial setting. It is shown in FIG. 6 as waveform D. For example, at a normal state before a malfunction (e.g., damage to detector 14 or a break of its lead wire), no mechanical coupling signal is generated at point D shown in FIG. 5. However, after the malfunction, the mechanical coupling signal from piezoelectric element 14a is generated and the mechanical coupling signal appears at point D, as shown in FIG. 6 as waveform D. As a result, the output of judge circuit 28 is a high level at the malfunction as shown in FIG. 6 as waveform J. A signal informing the angular velocity sensor's malfunction is then outputted from signal output terminal 29 through a logical sum circuit 32, as shown in FIG. 6 as waveform L. In this exemplary embodiment, a feedback signal from the driver circuit 15, that is an output of full wave rectifier 18, is supplied to logic sum circuit 32 through judge circuit 33. The angular sensor informs the malfunction via signal output terminal 29, even when driver plates 11 and 12 are not driven. Accordingly, the driving signal is supplied to logical sum circuit 32 through judge circuit 33. Judge circuit 33 outputs a high level when the feedback signal is zero because driver plates 11 and 12 are not driven and outputs a signal informing the malfunction from signal output terminal 29 through logical sum circuit 32.

In the composition where the output of charging amplifier 20 is inputted to amplifier 25 as a self diagnosis means as shown in the first, the second and the third exemplary embodiments, when a signal exceeding an input range of synchronous detector 22 is inputted from band pass filter 21, the output signal at output terminal 24 sometimes varies although no angular velocity signal is added. In this case, it is desirable to change the composition to input the output signal of band pass filter 21 to amplifier 25, to detect saturation of synchronous detector 22 as a criterion for judging and to match a time constant of filter 27 with a time constant of low pass filter 23.

Fourth Exemplary Embodiment

Figure 7:
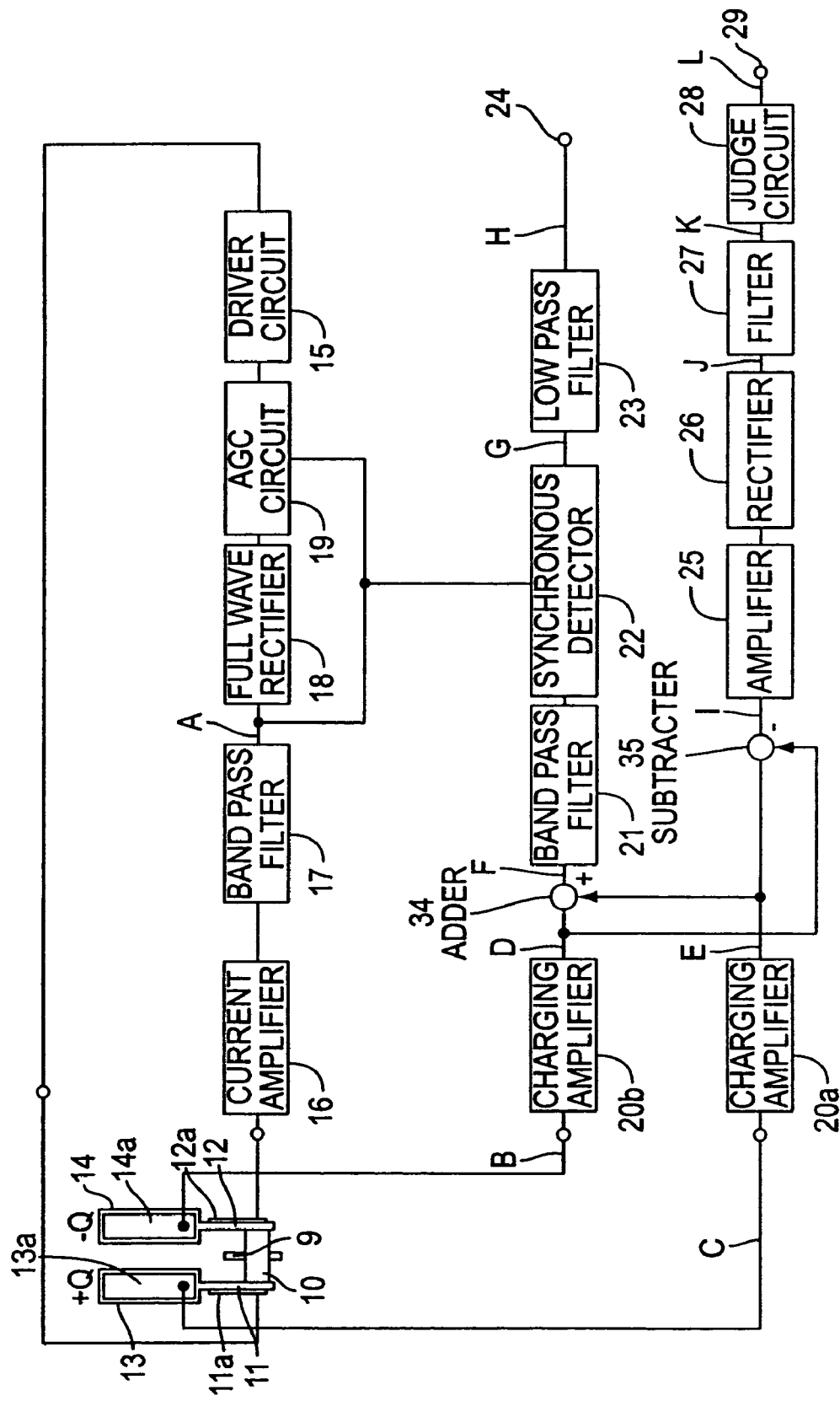
FIG. 7 is a block diagram of an angular velocity sensor in accordance with a fourth exemplary embodiment of the present invention.
Figure 8:
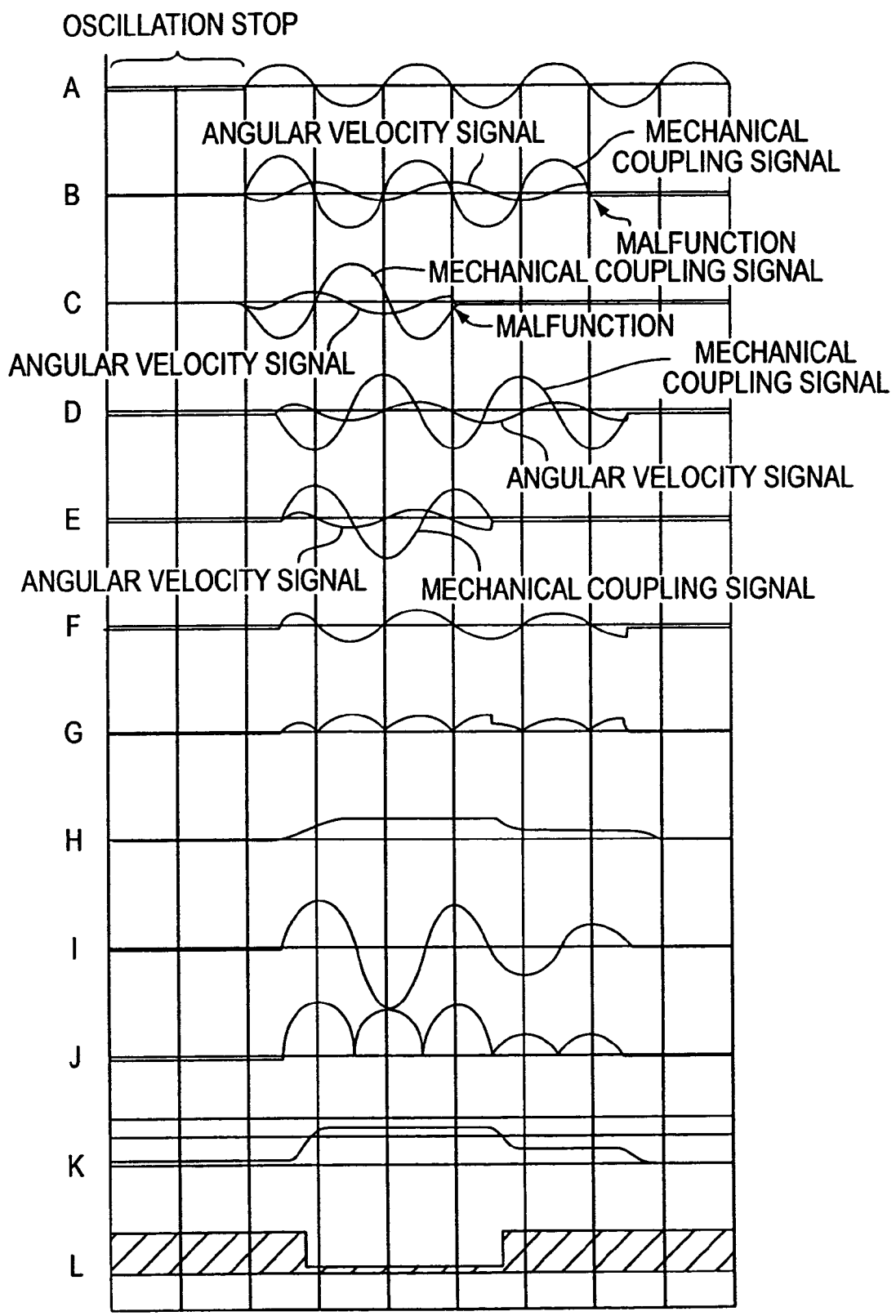
FIG. 8 shows waveforms at various points of the angular velocity sensor of FIG. 7.

FIG. 7 is a circuit diagram of an angular velocity sensor in accordance with a fourth exemplary embodiment of the present invention. Also in this exemplary embodiment, an initial setting is made so that when the mechanical coupling signals from piezoelectric elements 13a and 14a are added, their sum becomes zero by trimming either detector plate 13 or 14, like in the third exemplary embodiment. The signal from piezoelectric element 13a is amplified at a charging amplifier 20a, the signal from piezoelectric element 14a is amplified at a charging amplifier 20b, and they are added at adder 34. Adder 34 outputs a sum signal that is outputted from output terminal 24, after being processed, as an angular velocity signal. Subtracter 35 subtracts the output of charging amplifier 20b from the output of charging amplifier 20a and the result, after being processed, is outputted from signal output terminal 29 as a self diagnosis signal. Waveforms at the indicated points in FIG. 7 are shown in FIG. 8. Amplifier 25, rectifier 26 and filter 27 can be omitted. Although the explanation was made using a tuning fork type angular velocity sensor, it is possible to detect a malfunction using the mechanical coupling signal in various other types of angular velocity sensors; e.g., triangular prism type, solid cylinder type, tuning fork type or tubular type; because such other types of angular velocity sensors also generate a mechanical coupling signal.

Fifth Exemplary Embodiment

Figure 9:
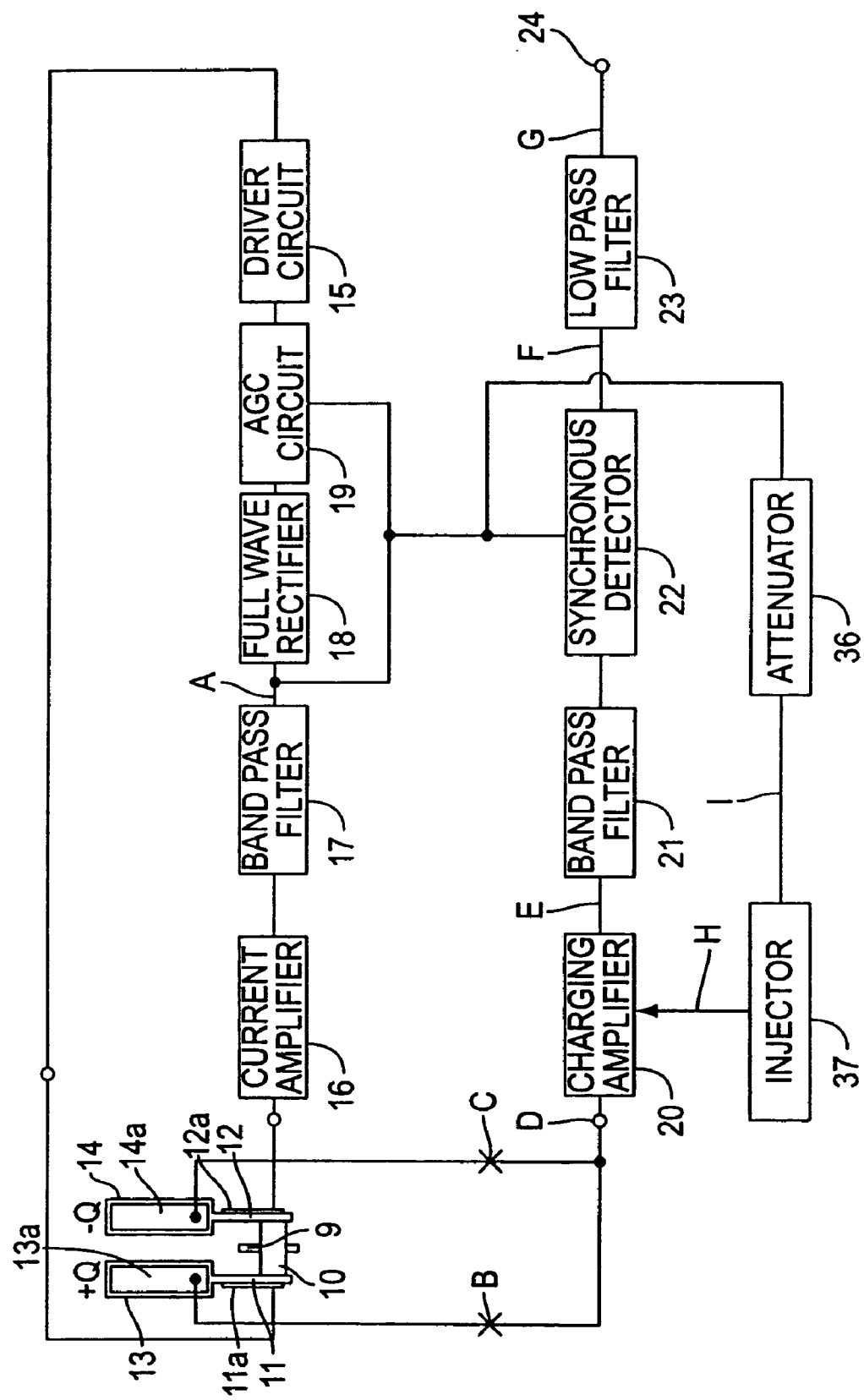
FIG. 9 is a block diagram of an angular velocity sensor in accordance with a fifth exemplary embodiment of the present invention.

FIG. 9 is a circuit diagram of an angular velocity sensor in accordance with a fifth exemplary embodiment of the present invention.

Figure 10:
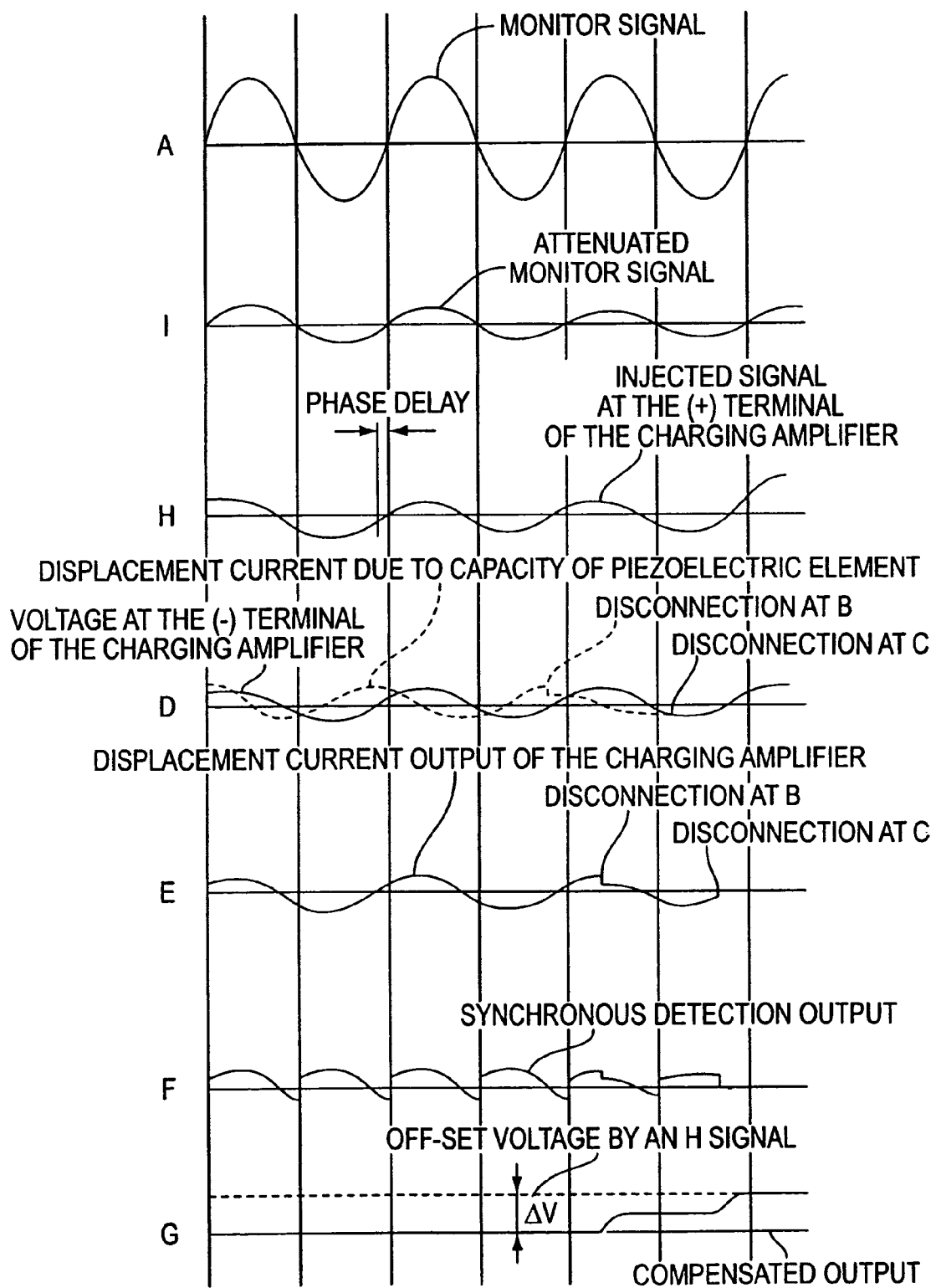
FIG. 10 shows waveforms at various points of the angular velocity sensor of FIG. 9.

An alternating signal of about 1 Vp-p and 1.5 kHz is applied from a driver circuit 15 to a piezoelectric element 11a of a driver plate 11. Driver plates 11 and 12 start tuning fork vibration inward and outward against a supporting pin 9 as a center. A voltage proportional to an applied signal is induced at a piezoelectric element 12a of driver plate 12 by tuning fork vibration and is outputted from point A as a monitor signal after passing through a current amplifier 16 and a band pass amplifier 17. The output signal is shown in FIG. 10 as waveform A. This signal is fed back to a driver circuit 15 through an AGC (Automatic Grain Control) circuit 19 and the level of the driving signal is controlled to always be constant at point A. In the detecting part of the circuit, the signals from piezoelectric elements 13a and 14a are synthesized at point D and the synthesized signal is supplied to a charging amplifier 20. The monitor signal from point A synchronized with a tuning fork vibration is attenuated by an attenuator 36 and is supplied to a non-inverted input terminal of a charging amplifier 20 after passing through an injector 37. The output of charging amplifier 20 is outputted from an output terminal 24 after passing through a band pass filter 21, a synchronous detector 22 and a low pass filter 23. Signal waveforms at point I (the output of attenuator 36), H (the output of injector 37), E (the output of charging amplifier 20), F (the output of synchronous detector 22) and G (the output of low pass filter 23) are shown in FIG. 10 as waveforms I, H, E, F and G, respectively.

Figure 11A:
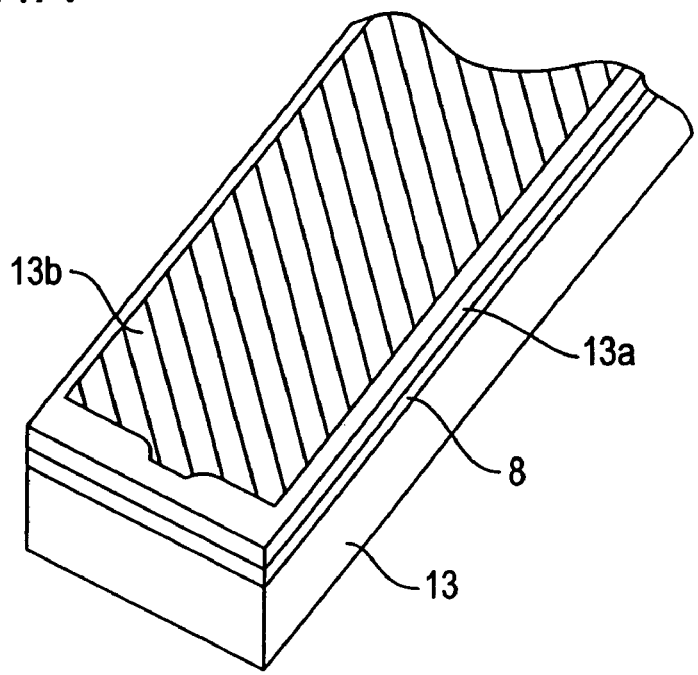
FIG. 11(*a*) is an expanded squint view of an essential part of the angular velocity sensor of FIG. 9.

In this exemplary embodiment, piezoelectric element 13a detecting an angular velocity is glued on a detector plate 13 by an adhesive 8. A silver electrode 13b is formed on piezoelectric element 13a as shown in FIG. 11(a).

Figure 11B:
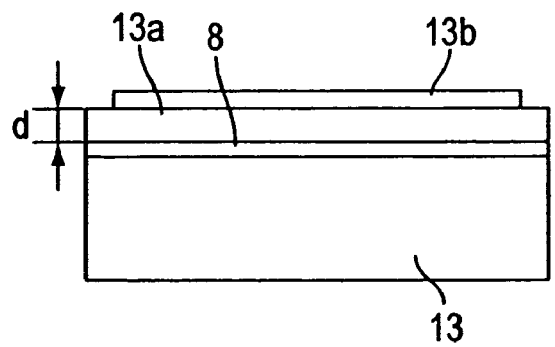
Figure 11C:
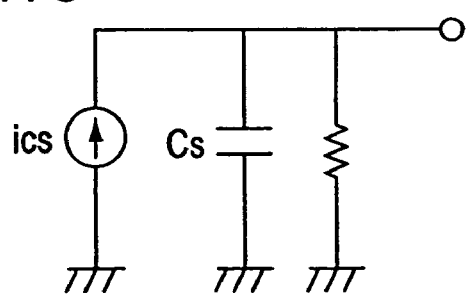

Detector plate 13, piezoelectric element 13a and silver electrode 13b form a parallel plate capacitor as shown in FIG. 11(b) and its equivalent circuit is shown in FIG. 11(c). The capacity of a capacitor formed by piezoelectric element 13a is expressed by equation (1).

$$Cs1 = \epsilon * S/d \quad (1)$$

ε: permittivity of piezoelectric element,
S: area of the electrode, and
d: thickness of piezoelectric element.

Similarly, the capacity of a capacitor formed by piezoelectric element 14a is expressed by equation (2).

$$Cs2 = \epsilon * S/d \quad (2)$$

ε: permittivity of piezoelectric element,
S: area of the electrode, and
d: thickness of piezoelectric element.

There are the following relations between the sensitivities of piezoelectric elements detecting an angular velocity and capacities Cs1 and Cs2 expressed by equations (1) and (2).

The sensitivity is proportional to area S and capacity C is proportional to area S; therefore, the sensitivity is proportional to capacity C. Therefore, if a capacity variation can be detected, a sensitivity variation can be conjectured and it is therefore possible to detect a sensitivity abnormality.

Figure 12:
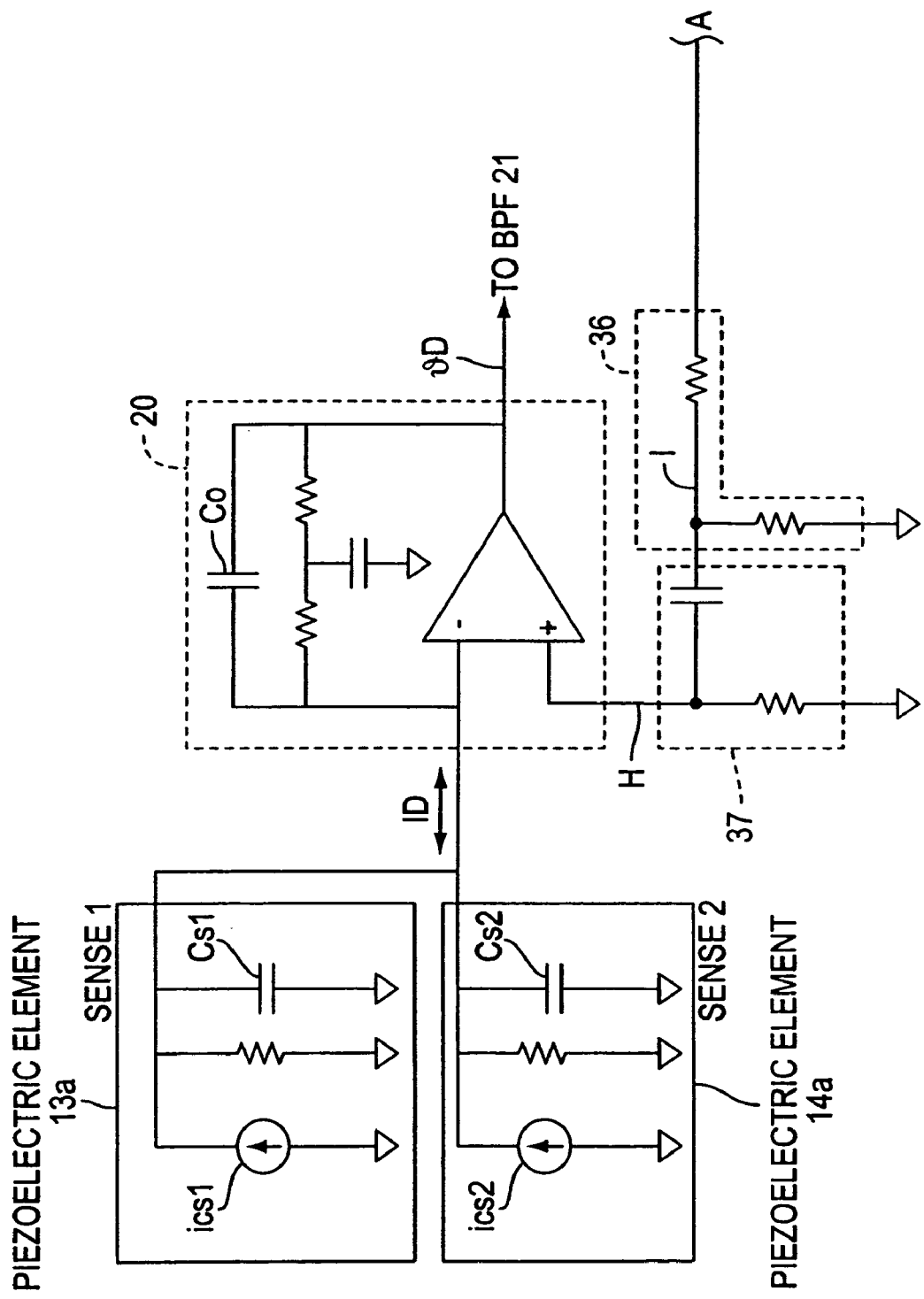
FIG. 12 is a circuit diagram showing a circuit configuration of the principal part of the angular velocity sensor of FIG. 9.

Now, monitor signal A at point A is attenuated at attenuator 36, as shown in waveform I of FIG. 10, and supplied to injector 37. Injector 37 is composed of, for example, a capacitor and a resistor shown in FIG. 12. A signal phase shifted against monitor signal A, as shown in waveform H of FIG. 10, is supplied to a non-inverted input terminal of charging amplifier 20. However, because the inverted input and the non-inverted input of charging amplifier 20 have virtually the same potential, the signal from injector 37 supplied to the non-inverted input terminal also appears at the inverted input terminal of charging amplifier 20, as shown by waveform D in FIG. 10.

As a result, a displacement current ID shown by waveform D (broken line) of FIG. 10 appears at capacity components Cs1 and Cs2 of piezoelectric elements 13a and 14a connected to the inverted input terminal and a voltage shown by waveform E of FIG. 10 is outputted from charging amplifier 20. The output voltage "ve" at point E is expressed by equation (3).

$$ve = Vm * \alpha * (1/C0) * (Cs1 + Cs2) * ID \angle \phi \quad (3)$$

ve: output voltage E (Vp-p) of charging amplifier,
Vm: monitor voltage (Vp-p),
α: attenuation factor (0<α<1) of attenuator 36,
∠ø: phase shift (0°<ø<90°) by injector 37,
C0: feedback capacity (pF) of charging amplifier 20, and
ID: displacement current (pA).

Signal Vout obtained from output terminal 24 is expressed by equation (4).

$$Vout = A * D * Vm * \alpha * (1/CO) * (Cs1 + Cs2) * ID * \sin \phi \quad (4)$$

D: detection constant of synchronous detector 22 and
A: dc gain of low pass filter 23.

Signal E shown in FIG. 10 is phase shifted by ∠ø against monitor signal A and is detected at synchronous detector 22 after being amplified at band pass filter 21. Here, only a signal component corresponding to the phase shift is extracted, amplified at low pass filter 23, and outputted from terminal 24 as a dc offset component. Usually, it is good to adjust the offset voltage of the output, for example 2.5 V, considering this dc offset component.

From equation (3), because signal E shown in FIG. 10 is proportional to capacity Cs1 or Cs2 of piezoelectric element 13a or 14a for angular velocity detection, respectively, for example, when a disconnection occurs at point B or C shown in FIG. 9, there is a signal level variation as shown by waveforms E and F of FIG. 10 and as a result, the voltage level at output terminal 24 varies. This level variation can indicate an abnormality, which abnormality is judged as a sensor malfunction by, for example, a comparison to a threshold value of the level variation.

Because the input signal of injector 37 is obtained from the monitor signal A of the drive circuit 15 and the output signal is applied to the input terminal of charging amplifier 20, whenever any component or any part of the tuning fork, the drive circuit or the detection circuit malfunction, a signal appears at output terminal 24 as a variation of the dc offset component and it is therefore always possible to detect a sensor malfunction.

Sixth Exemplary Embodiment

Figure 13:
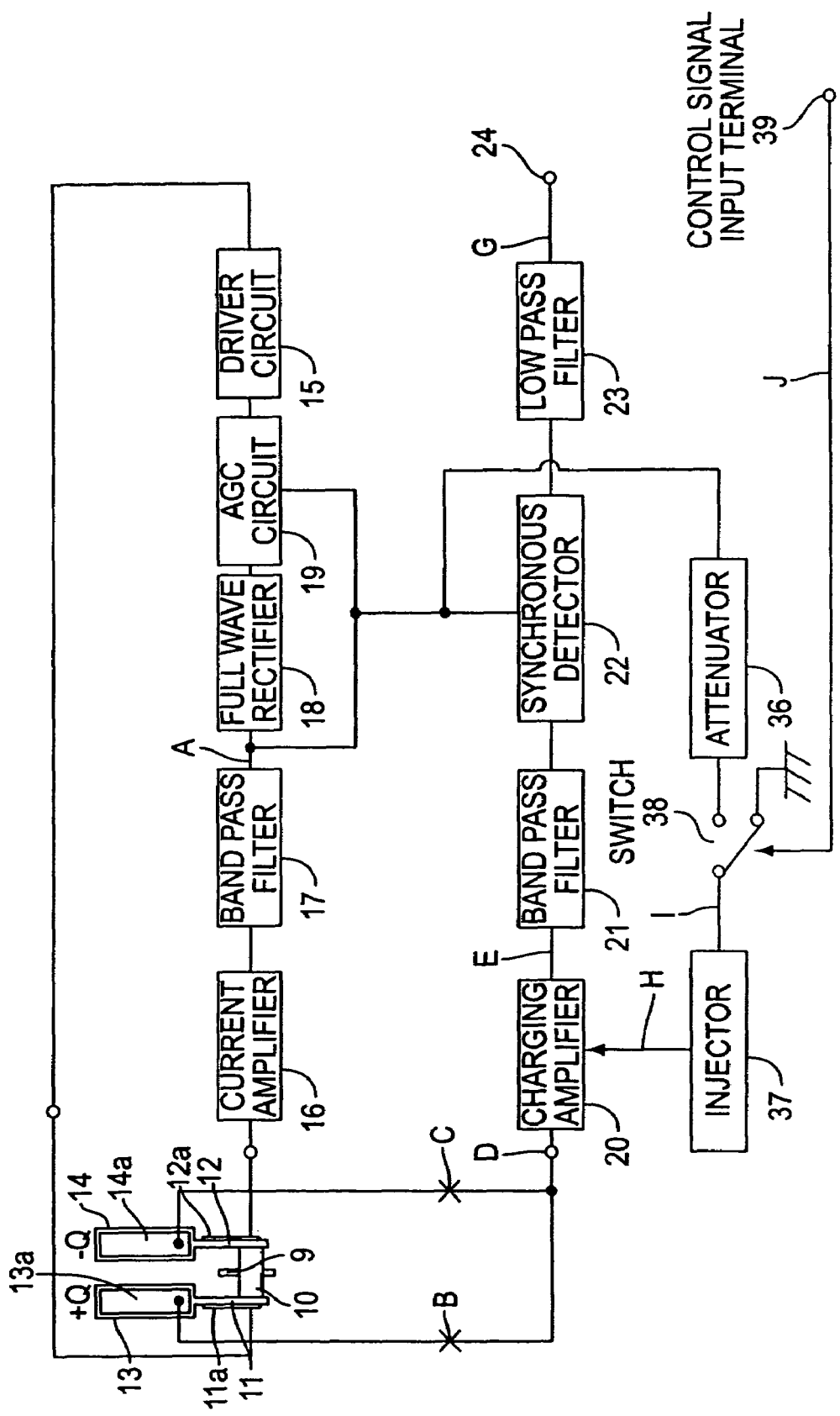
FIG. 13 is a block diagram of an angular velocity sensor in accordance with a sixth exemplary embodiment of the present invention.
Figure 14:
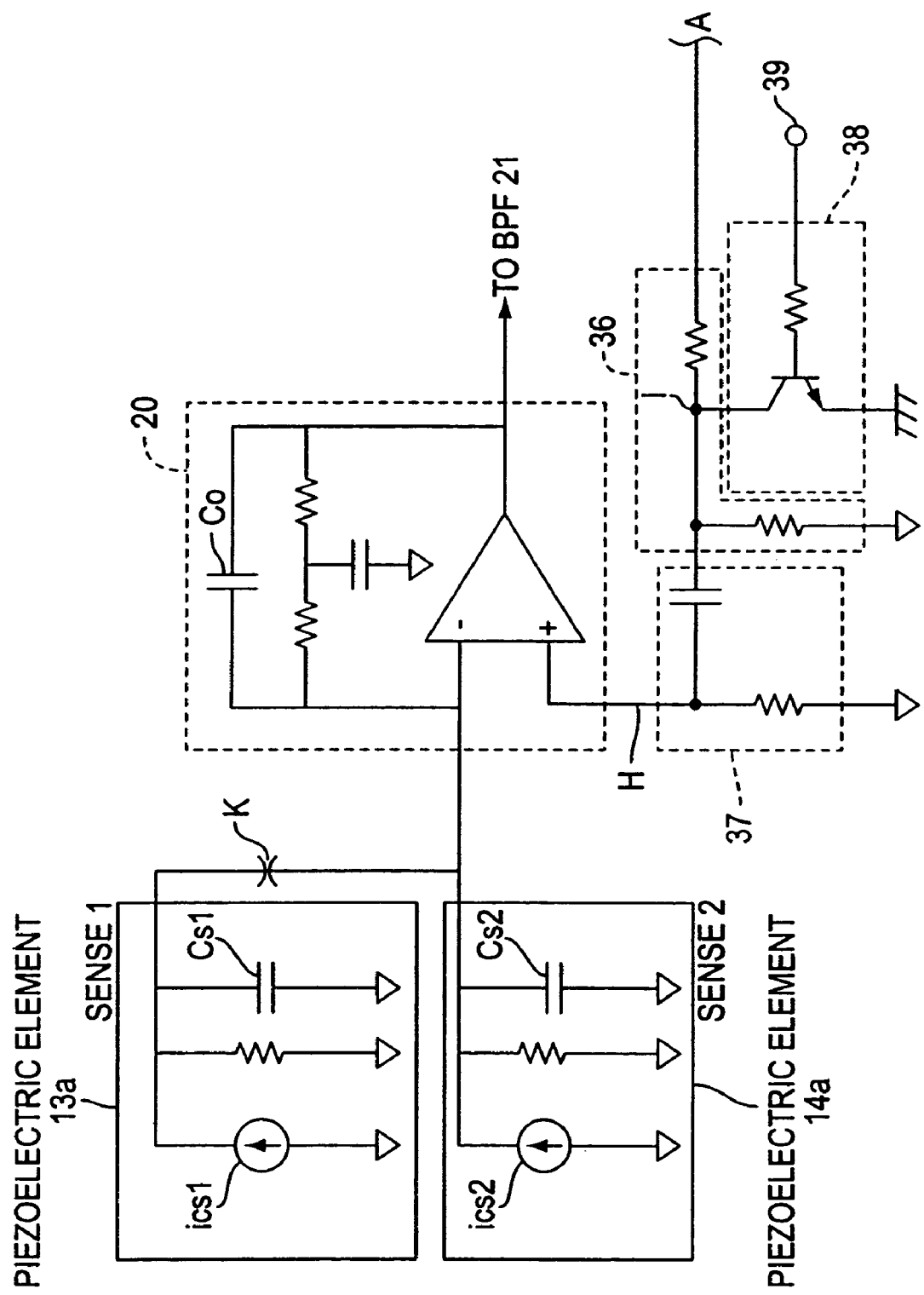
FIG. 14 is a circuit diagram of the essential part of the angular velocity sensor of FIG. 13.
Figure 15:
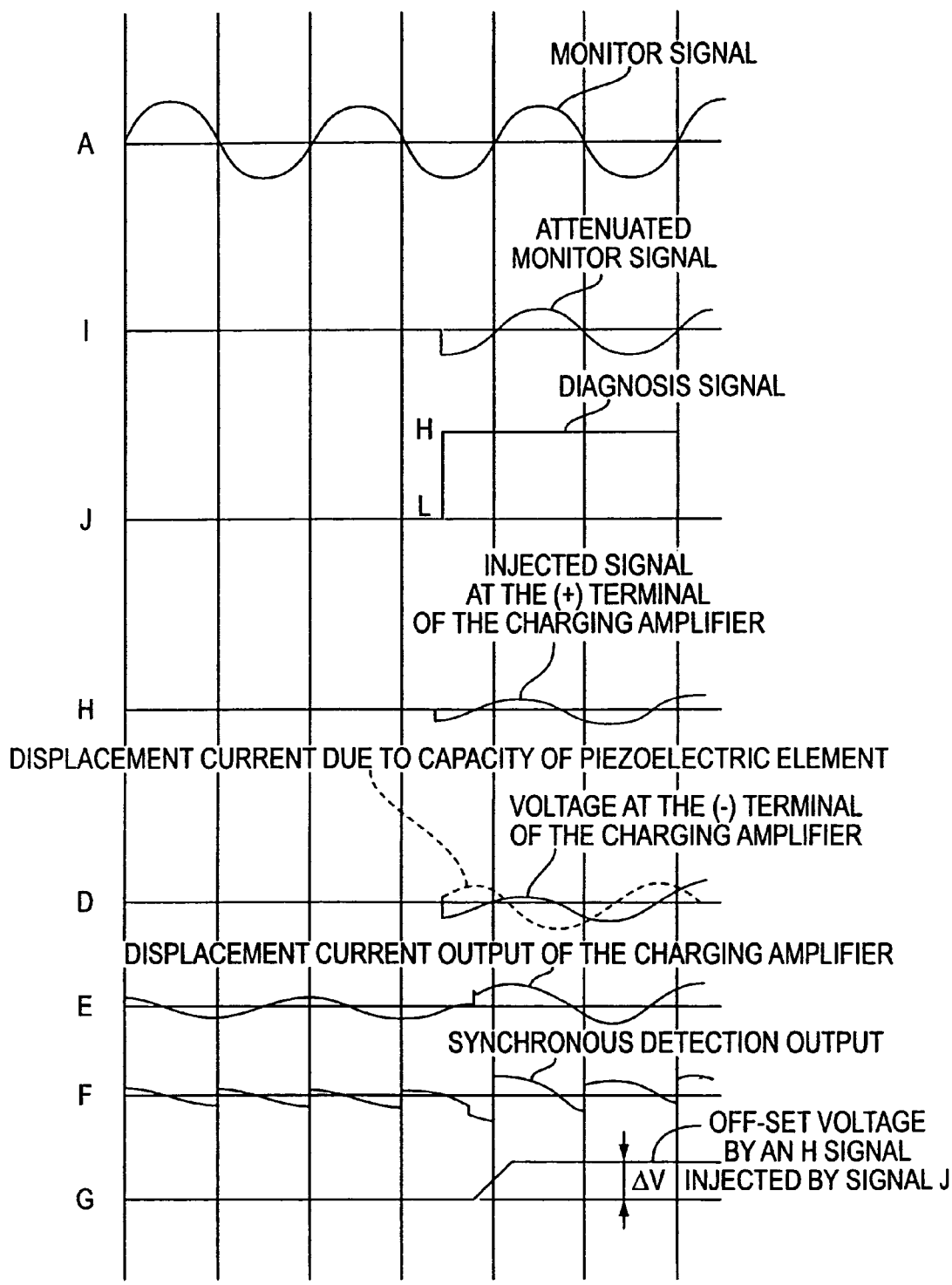
FIG. 15 shows waveforms at various points of the angular velocity sensor of FIG. 13.

FIG. 13 is a circuit diagram of an angular velocity sensor in accordance with a sixth exemplary embodiment of the present invention. In addition to the fifth exemplary embodiment, the input of injector 37 is made to be selectively connected to the output of attenuator 36 or to the ground, by a switch 38 controlled by an external signal from a control terminal 39. A circuit diagram of an essential part of this embodiment is shown in FIG. 14 and the waveforms are shown in FIG. 15.

Because monitor signal I attenuated at attenuator 36 is usually disconnected from injector 37 by switch 38, monitor signal 1 is not transmitted to injector 37 and accordingly, the sensor outputs are in an ordinary state. When a signal shown by waveform J of FIG. 15, such as a check signal from a computer, is applied to control terminal 39 shown in FIG. 13, switch 38 closes and signal I from attenuator 36 is transmitted to injector 37. As a result, the signals at each point vary as shown by waveforms H, D, E and F of FIG. 15 and an offset voltage linked to the check signal applied to control terminal 39 is generated at output terminal 24, as shown by waveform G of FIG. 15. Because this offset variation is determined by equation (4) of the fifth exemplary embodiment, it is possible to know a sensor abnormality by monitoring this offset variation.

Seventh Exemplary Embodiment

Figure 16:
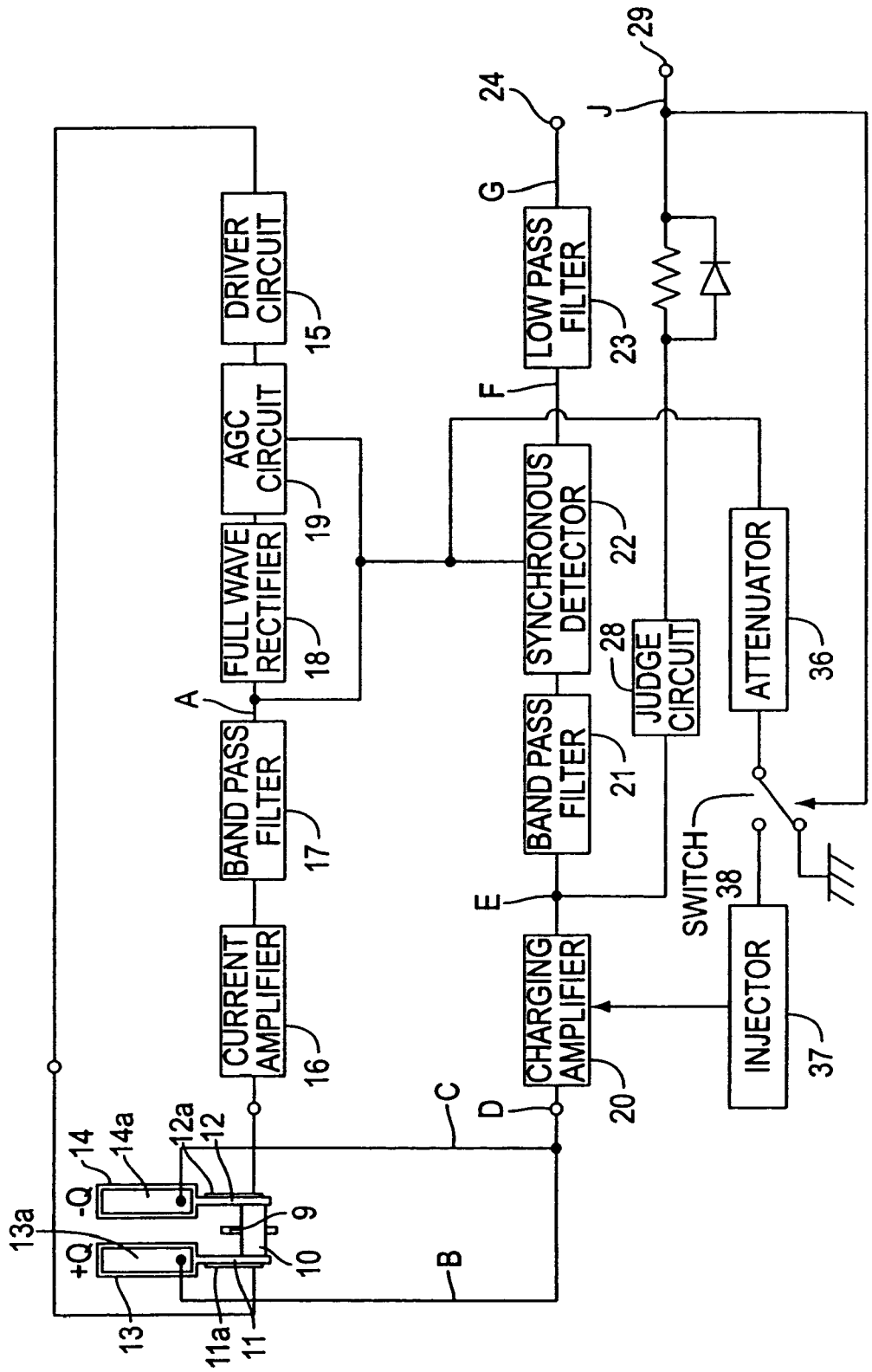
FIG. 16 is a block diagram of an angular velocity sensor in accordance with a seventh exemplary embodiment of the present invention.
Figure 17:
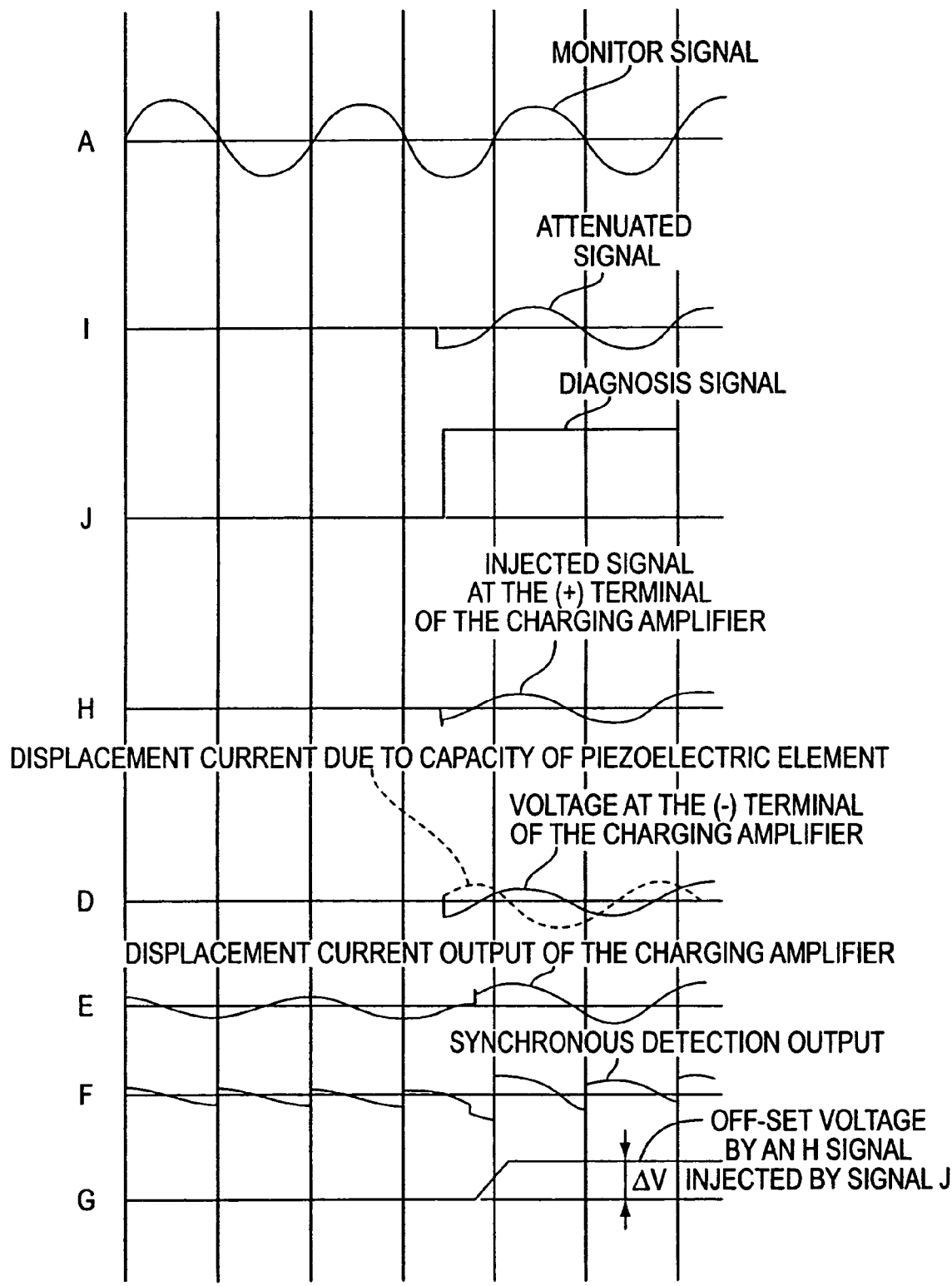
FIG. 17 shows waveforms at various points of the angular velocity sensor of FIG. 16.
Figure 18:
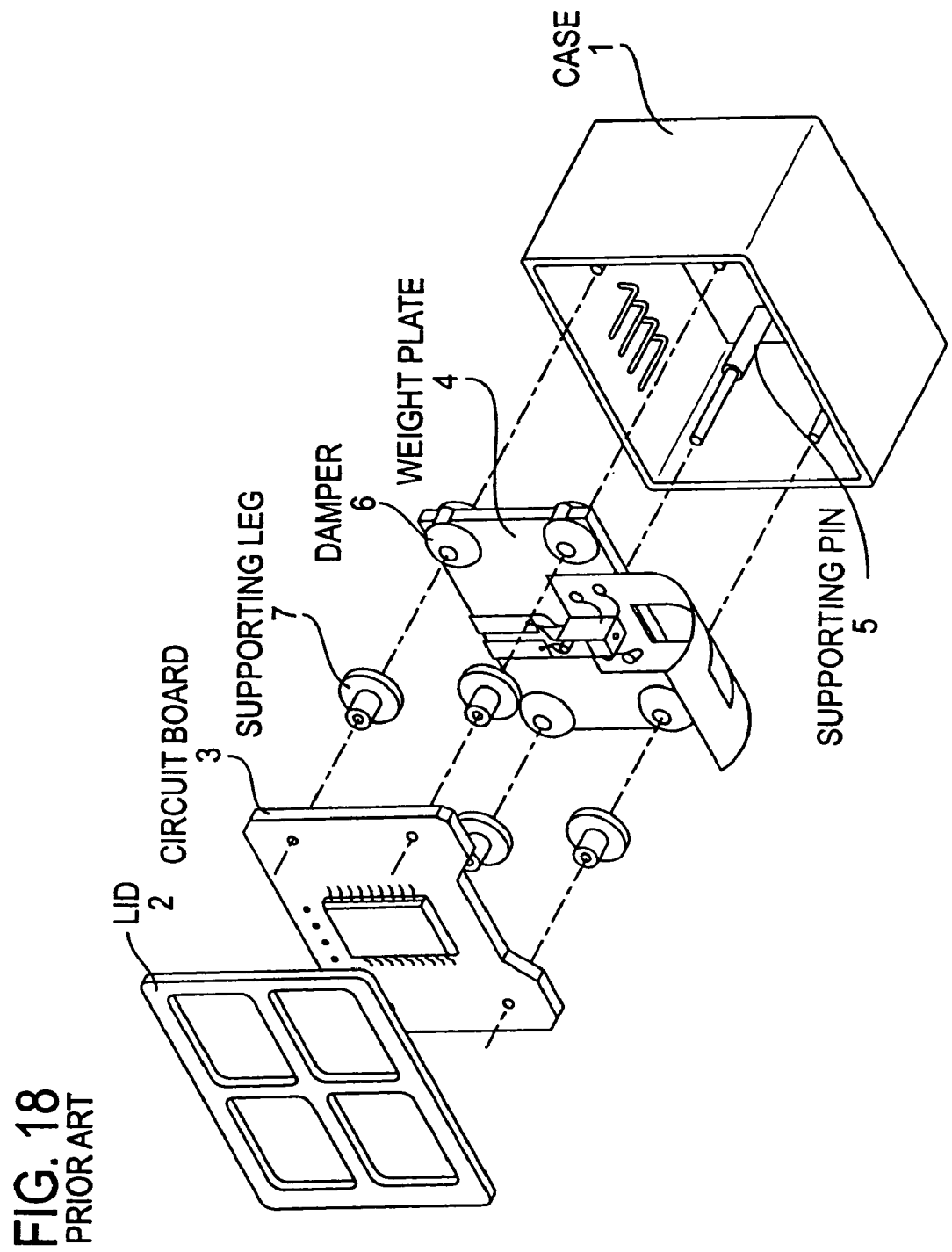
FIG. 18 is a squint view for assembling an essential part of an angular velocity sensor in accordance with the prior art.
Figure 19:
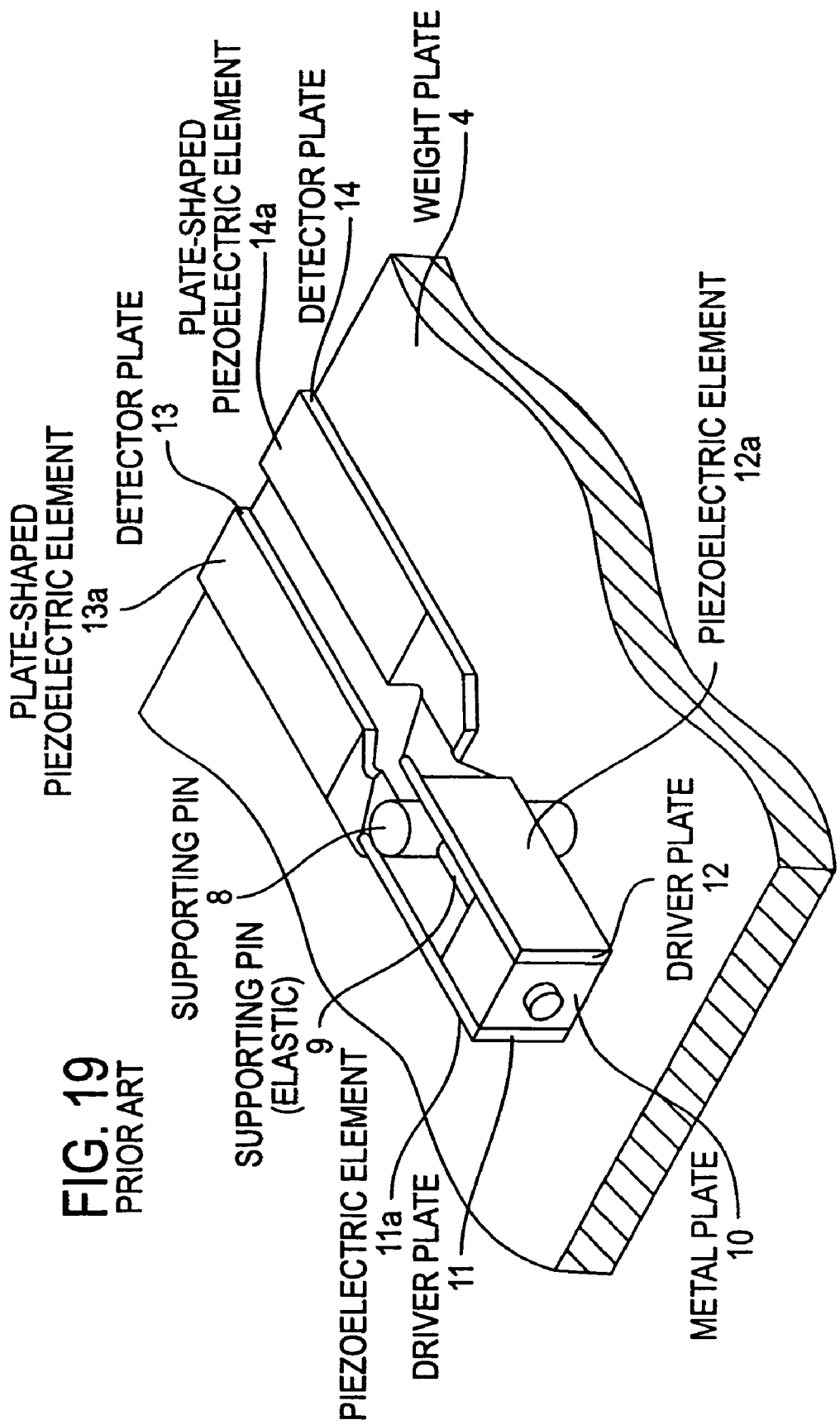
FIG. 19 is an expanded squint view of an essential part of the prior art angular velocity sensor of FIG. 18.

FIG. 16 is a circuit diagram of an angular velocity sensor in accordance with a seventh exemplary embodiment of the present invention. The waveforms are shown in FIG. 17. The seventh exemplary embodiment details when an input terminal of the external signal for controlling the switch 38 is used in common with output terminal 29 of judge circuit 28. Judge circuit 28 monitors, for example, output E of charging amplifier 20 and detects an abnormal voltage generated by, for example, an abnormal shock or vibration applied to the tuning fork from the outside and outputs a signal to inform an abnormality from terminal 29 to the outside. Although the control signal input terminal of switch 38 is used in common with output terminal 29, the connect/disconnect logical value is set to be inverse relative to the logical output of the judge circuit 28. Therefore, in an ordinary state in which switch 38 is not working, an abnormal voltage generated by an abnormal shock or vibration of the tuning fork applied from the outside is detected and the abnormality is indicated to the outside (by a suitable signal). In a state in which the sensor is checked, by inputting the check signal from terminal 29 and monitoring the sensor output of terminal 24, a multifunction diagnosis for malfunction can be made using only one terminal and therefore a high cost performance is realized.

In the case in which connect/disconnect logical value of switch 38 is set to be equal to the logical value of judge circuit 28, it is possible to transfer to a self diagnosis mode by forcibly working switch 38 by the logical output of judge circuit 28 and it is possible to keep outputting a signal as an abnormality detection state at terminal 29 until a reset signal for a self diagnosis mode is supplied from the outside.

Here, although an exemplary embodiment is described in which a sensor working state is indicated using a sensor signal, it is also possible to offset adjust the sensor output. In this case, it is preferred to adjust an attenuation amount by attenuator 36 or adjust the offset by adjusting the phase shift amount by injector 37. It is also possible to compensate for temperature for the sensor output by using a temperature sensitive element so that an attenuation amount or a phase shift amount varies with temperature.

It is similar, if the output of injector 37 is applied to band pass filter 21 and synchronous detector 22.

Eighth Exemplary Embodiment

Figure 20A:
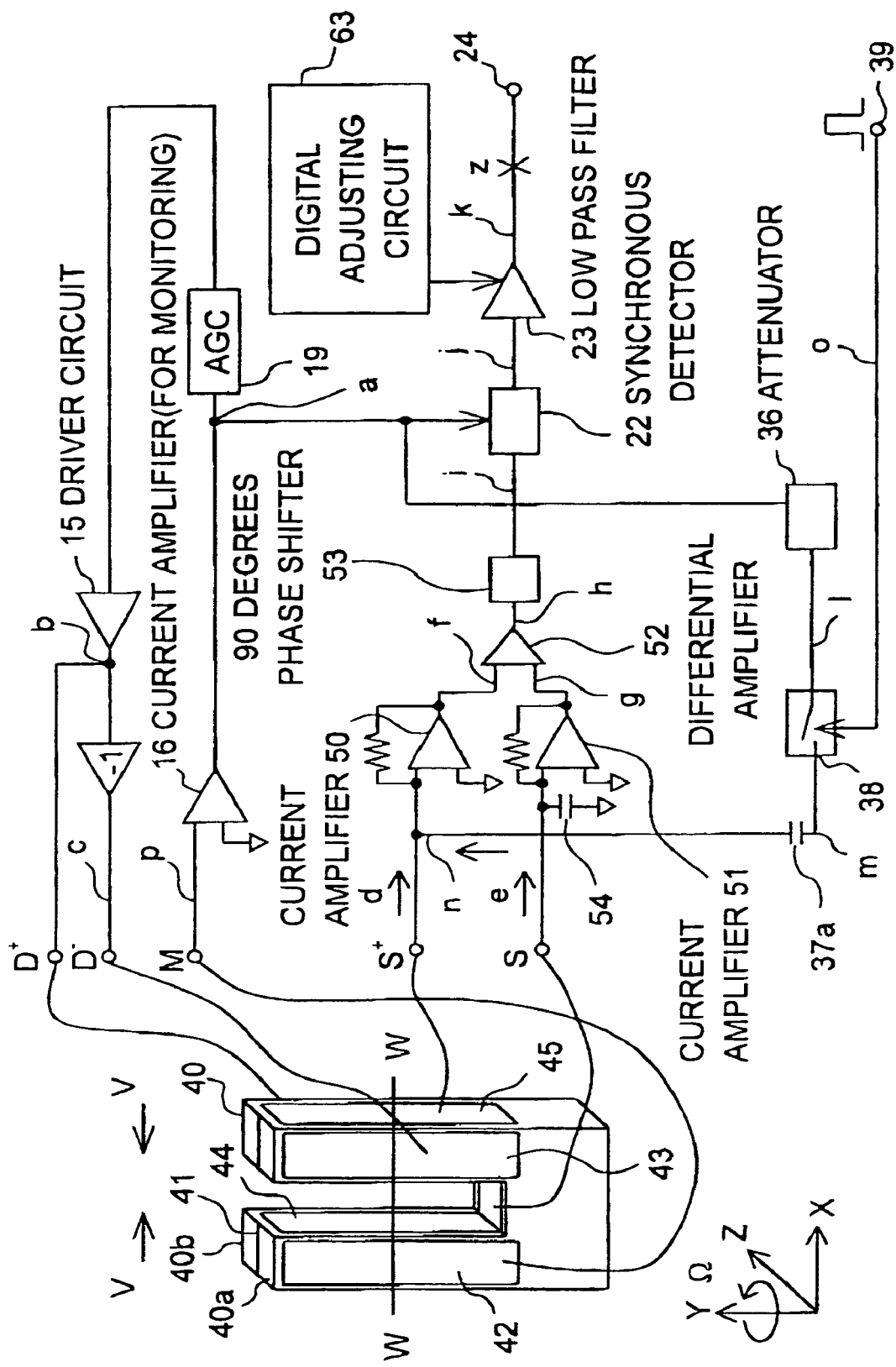
FIG. 20(*a*) is a circuit diagram of an angular velocity sensor in accordance with an eighth exemplary embodiment of the present invention.
Figure 20B:
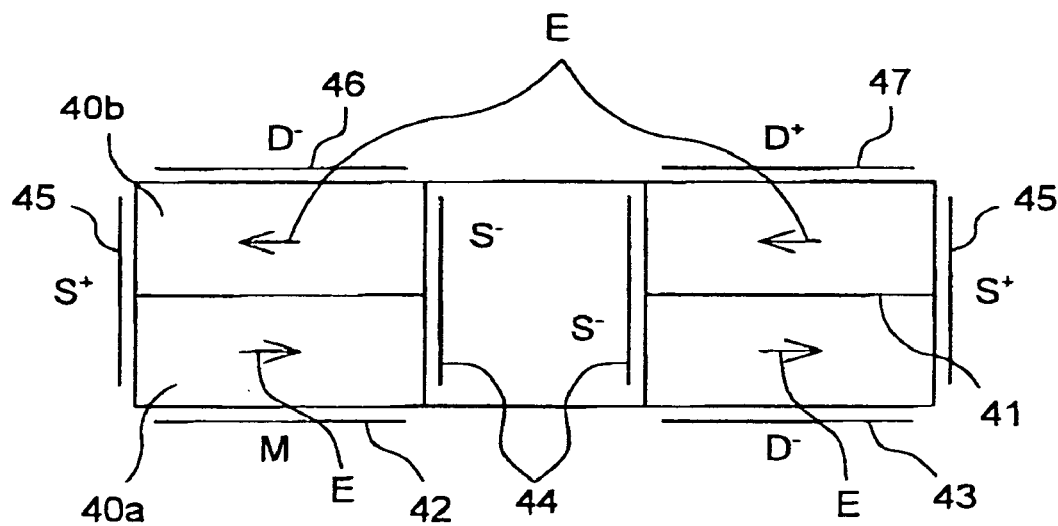
Figure 20C:
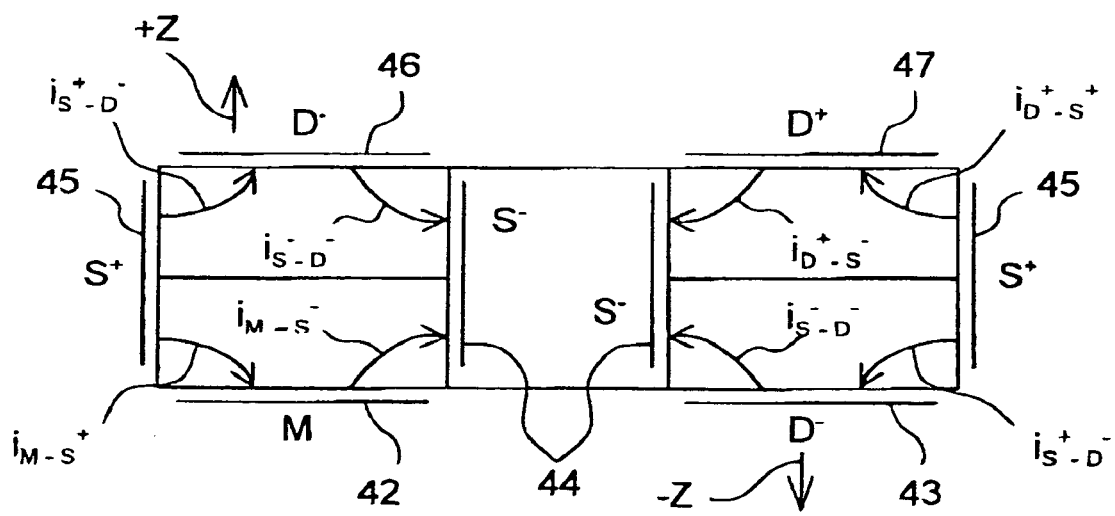

FIG. 20(a) is a circuit diagram of an angular velocity sensor in accordance with an eighth exemplary embodiment of the present invention. FIG. 20(b) shows a cross sectional view of a sensor element 40 of the present embodiment cut at the plane normal to the y-axis including line W—W (denoted by W—W plane or W—W cross section hereinafter). FIG. 20(c) shows detailed current distribution in the W—W cross section of the sensor element 40. In FIG. 20(a), elements which have the same function as in FIGS. 9, 13 and 16 are denoted by the same reference numerals and a detailed explanation thereto is omitted.

As shown in FIGS. 20(a), 20(b) and 20(c), the sensor element 40 (e.g., crystal (quartz) tuning fork vibrator) is constructed by directly bonding two crystal tuning fork vibrator pieces 40a and 40b at bonding surface 41 in such a manner that the directions of the electric axes E of the vibrator pieces 40a and 40b are aligned opposite to each other along the width direction (along the x-axis direction) of the vibrator pieces. Thus the sensor element 40 has a bimorph structure.

The sensor element is constructed by forming monitor electrode 42, driving electrodes 43, 46 and 47 (see FIGS. 20(a), (b)), and sensing electrodes 44 and 45, made of metal such as gold, on the appropriate surfaces of the crystal tuning fork vibrator pieces 40a and 40b.

FIGS. 20(b) and 20(c) show the situation when polarity of driving electrode 47 is positive (denoted by D+), polarity of driving electrodes 43 and 46 is negative (denoted by D−), polarity of sensing electrode 44 is negative (denoted by S−) and polarity of sensing electrode 45 is positive (denoted by S+). Also, monitor electrode 42 is denoted by M.

First, an explanation will be made for individual roles of the circuit components newly introduced in this exemplary embodiment. Turning to FIG. 20(a), current amplifiers 50 and 51, having a phase difference of 0 or 180 degrees between input current and output voltage, amplify the signals from sensing electrodes 45 and 44, respectively. Differential amplifier 52 amplifies and outputs the difference between the outputs of current amplifiers 50 and 51. 90 degree phase shifter 53 shifts the phase of the signal outputted from differential amplifier 52 by 90 degrees. Capacitor 54 is inserted between the input terminal of current amplifier 51 and the reference level in order to balance with capacitor 37a which works as an injector. Accordingly, the capacitance value of capacitor 54 is set nearly the same as that of capacitor 37a. By this configuration, even if the charge/discharge current in capacitor 37a is induced by the reference level variation owing to the voltage variation of the power source of the sensor and is inputted to current amplifier 50, this current balances with the charge/discharge current in the capacitor 54, so that it is canceled out by differential amplifier 52. As a result, a sensor with high durability against the voltage variation of the power source is obtained. Digital adjusting circuit 63 adjusts the output level of the sensor.

Next the fundamental operation of the angular velocity sensor shown in FIG. 20(a) is explained. As shown in FIG. 20(a), driven by driver circuit 15, sensor element 40 starts to vibrate and at the same time generates, at its monitor electrode 42, a monitor signal proportional to the intensity of the vibration. This monitor signal is processed at current amplifier 16 (monitor circuit) and AGC circuit 19 and finally is fed back to driver circuit 15. Thus, driving of sensor element 40 is performed stably by drive means composed of the closed loop.

The vibration of sensor element 40 is a tuning fork vibration along the x-axis direction with a velocity V as shown in FIG. 20(a). When an angular velocity around the y-axis is applied to the sensor element 40, a Coriolis force Fc=m×V×(where m is a mass of arm) is generated in the crystal tuning fork vibrator pieces 40a and 40b along the z-axis direction.

Internal current distribution in a W—W cross section of each arm of the sensor element 40 is shown in FIG. 20(c) when the above-mentioned Coriolis force is generated in each arm. As each arm of the sensor element 40 bends in opposite directions to each other along the z-axis, currents with almost the same amplitudes and opposite polarities are generated in sensing electrodes 44 and 45 via monitor electrode 42 and driving electrodes 43, 46 and 47, as shown in FIG. 20(c).

Currents $i_{S^-}$ and $i_{S^+}$, flowing at each sensing electrode 44 and 45, are expressed by formulae (5) and (6), respectively.

$$i_{S^-} = -(i_{S^-_D} + i_{M\text{-}S}^- + i_{D^+\text{-}S}^- + i_{S^-_D}^-) \tag{5}$$

$$i_{S^+} = (i_{S^+_D}^- + i_{M\text{-}S}^+ + i_{D^+\text{-}S}^+ + i_{S^+_D}^-) \tag{6}$$

The currents $i_{S^-}$ and $i_{S^+}$ expressed by formulae (5) and (6) are inputted to the current amplifiers 50 and 51 as indicated by d and e in FIG. 20(a). They are converted to voltage outputs and inputted to the differential amplifier 52. The output of differential amplifier 52 is inputted to phase shifter 53 where its phase is shifted by 90 degrees. The output of the phase shifter 53 is detected by synchronous detector 22 in synchronous with the monitor signal at point 'a'. The output of the synchronous detector 22 is inputted to low pass filter 23 where its gain and offset are adjusted by digital adjusting circuit 63 and finally outputted to output terminal 24.

Figure 21:
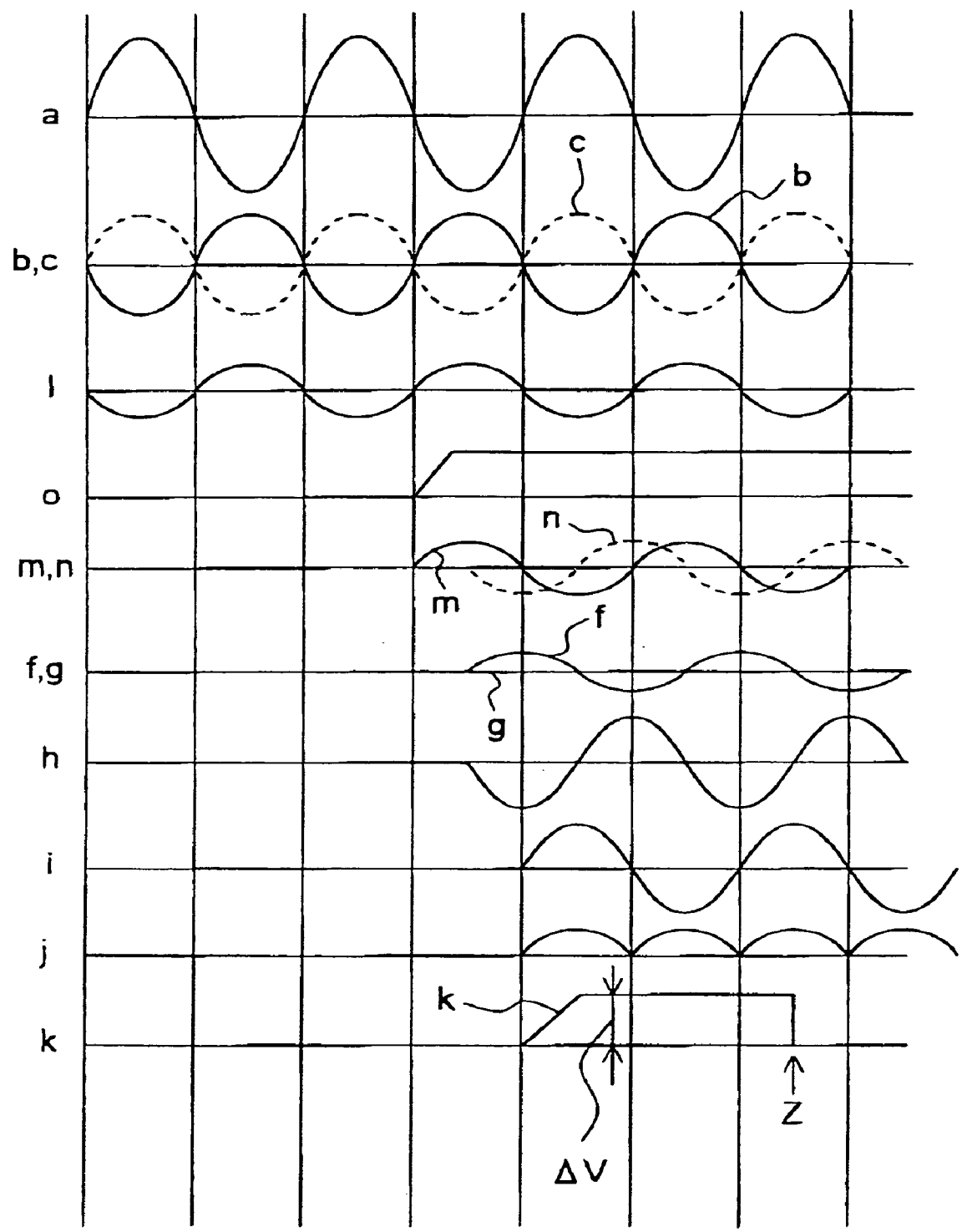
FIG. 21 shows waveforms at various points of the angular velocity sensor of FIG. 20(*a*).

Operational waveform of each part of the present angular velocity sensor shown in FIG. 20(a) is illustrated in FIG. 21. In FIG. 21, the signal waveform indicated by 'a' corresponds to a monitor signal at point 'a' monitoring the vibration level of sensor element 40 in a stationary operation state. Signal waveforms indicated by 'b' and 'c' correspond to the driving signals having opposite phases to each other for driving sensor element 40. The monitor signal is attenuated by attenuator 36 as shown in the waveform indicated by l. This signal is then supplied, through switch 38, to capacitor 37a (waveform indicated by m). Here, the switch 38 operates intermittently in response to an external diagnosis request signal supplied to control terminal 39 (waveform indicated by o).

Caused by the signal voltage applied to capacitor 37a, a displacement current with its phase shifted by 90 degrees against the monitor signal is induced (the waveform indicated by n). This displacement current is inputted to the current amplifier 50 and is converted to a voltage output (waveform indicated by f).

Each output of current amplifiers 50 and 51 (waveform indicated by f and g respectively) is inputted to differential amplifier 52. Differential amplifier 52 outputs a waveform indicated by h. The output of differential amplifier 52 is inputted to phase shifter 53 and its phase is shifted by 90 degrees, resulting in a waveform with the same phase as (indicated by i) or opposite phase relative to the monitor signal indicated by 'a'. The output waveform of phase shifter 53 (indicated by i) is detected by synchronous detector 22 in synchronous with the monitor signal 'a'.

Finally, the output from synchronous detector 22 (waveform indicated by j) is inputted to low pass filter 23 where its gain and offset are adjusted by digital adjusting circuit 63 and outputted to output terminal 24 (waveform indicated by k).

Self diagnosis operation, performed upon request via the external diagnosis request signal (waveform indicated by o), generates DC variation V (indicated in the waveform of k).

In order to enable detection of abnormality of the sensor, the level of this DC variation V in ordinary operation is set to a predetermined value by using, for example, an attenuator 36. If an abnormality such as wire breakage happens to occur at point Z in FIG. 20(a) for example, the level of DC variation V becomes different from the above predetermined value (indicated by Z in the waveform of k) while the external diagnosis request signal is applied. Thus, the abnormality of the present angular velocity sensor can be detected by watching the change in the level of the DC variation V, using the predetermined V as a threshold.

Although a capacitor is used for the injector in this embodiment, it is possible to use a resistor also.

Ninth Exemplary Embodiment

Figure 22:
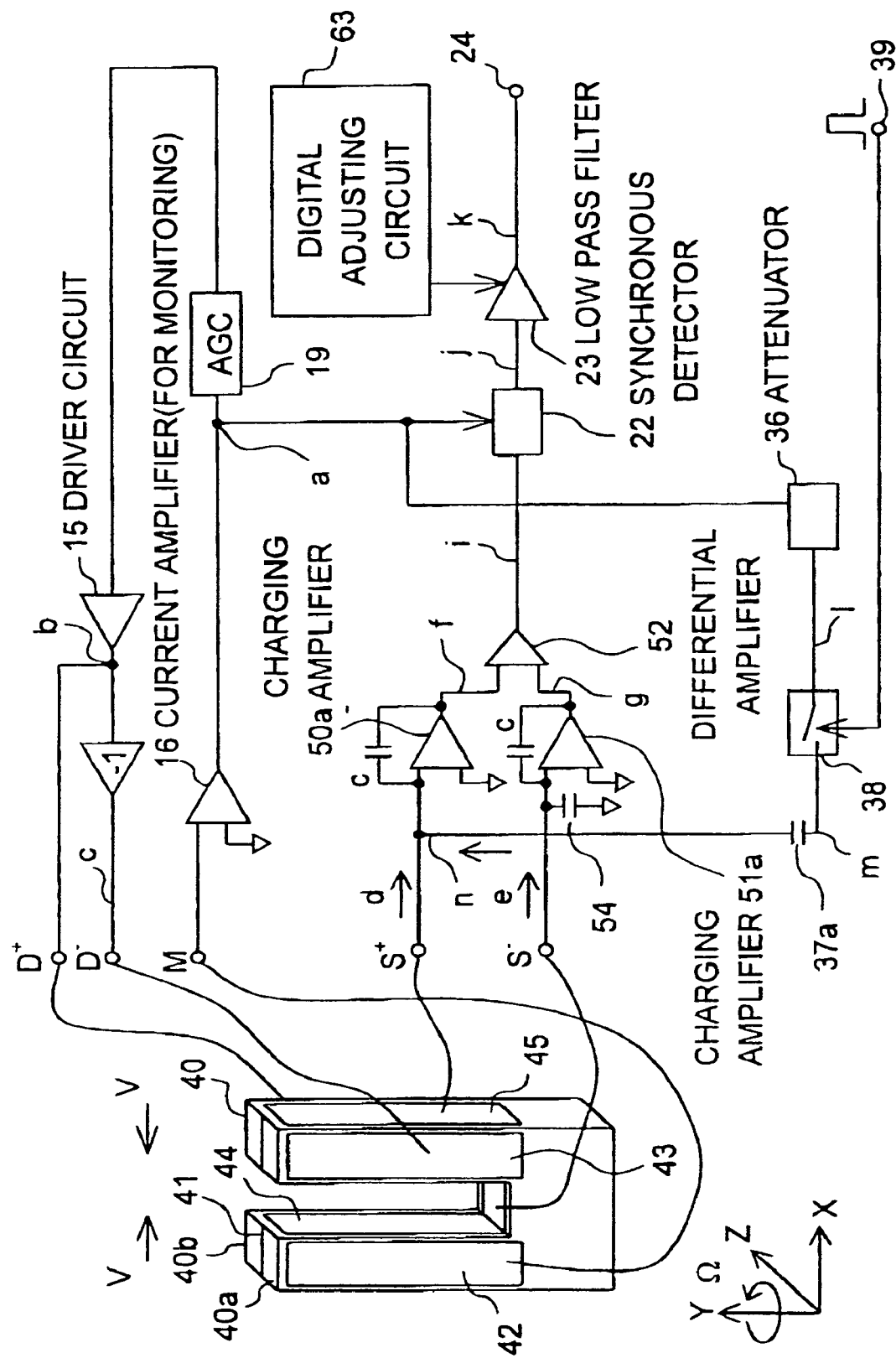
FIG. 22 is a circuit diagram of an angular velocity sensor in accordance with a ninth exemplary embodiment of the present invention.

FIG. 22 is a circuit diagram of an angular velocity sensor in accordance with a ninth exemplary embodiment of the present invention. In FIG. 22, elements which have the same function as in FIG. 20(a) are denoted by the same reference numerals and a detailed explanation thereto is omitted.

As shown in FIG. 22, charging amplifiers 50a and 50b with input-to-output phase shift of 90 or 270 degrees are used in this embodiment in place of current amplifiers 50 and 51 in FIG. 20(a). By using the charging amplifiers 50a and 50b, the phase shifter 53 shown in FIG. 20 can be omitted.

Figure 23:
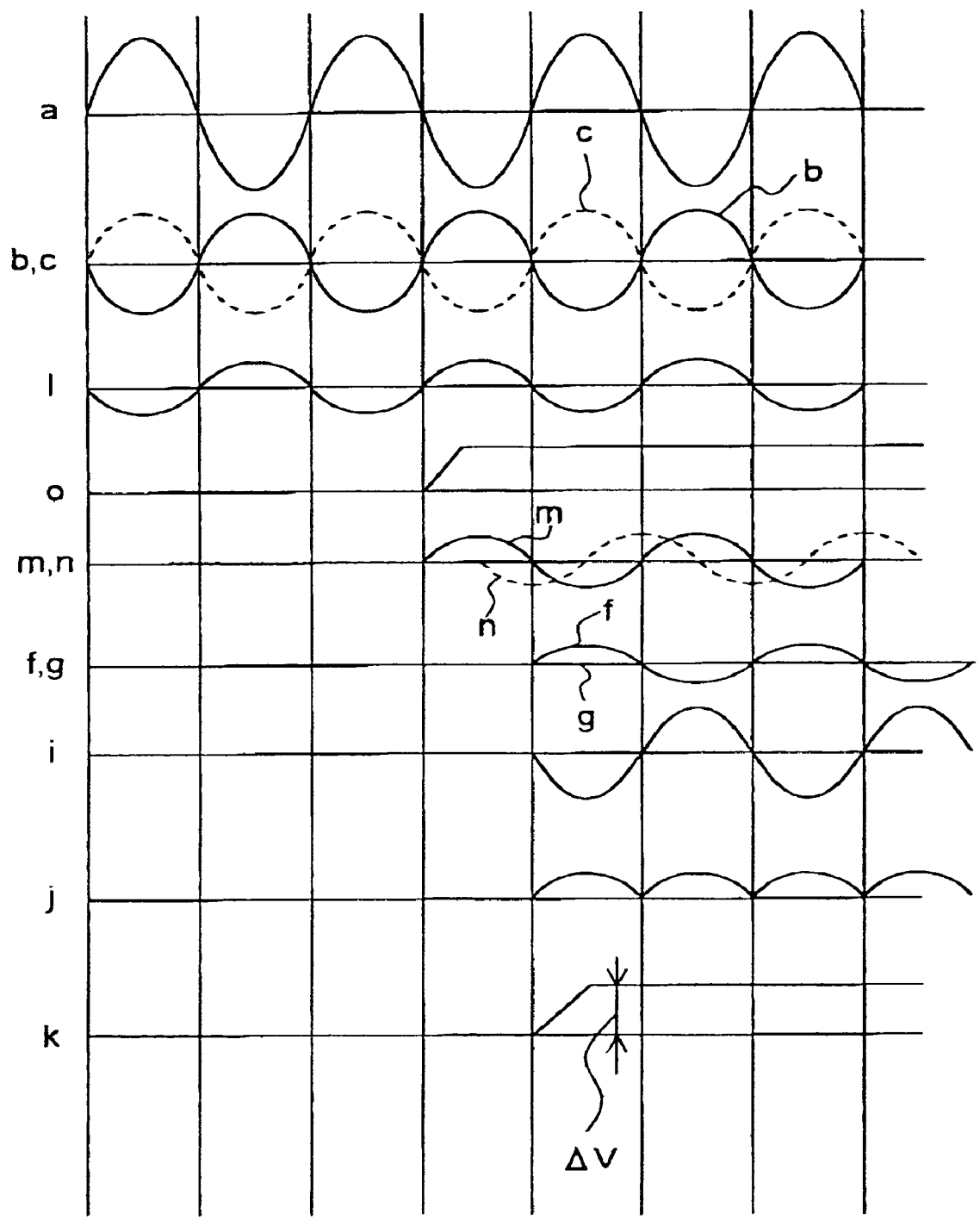
FIG. 23 shows waveforms at various points of the angular velocity sensor of FIG. 22.

Operational waveform of each part of the present angular velocity sensor shown in FIG. 22 is illustrated in FIG. 23. Each waveform shown in FIG. 23 is essentially the same as that of FIG. 21. What differs is, the phase of the waveform indicated by f deviates by 90 degrees and the phase of the waveform indicated by i deviates by 180 degrees (or inverted).

Tenth Exemplary Embodiment

Figure 24:
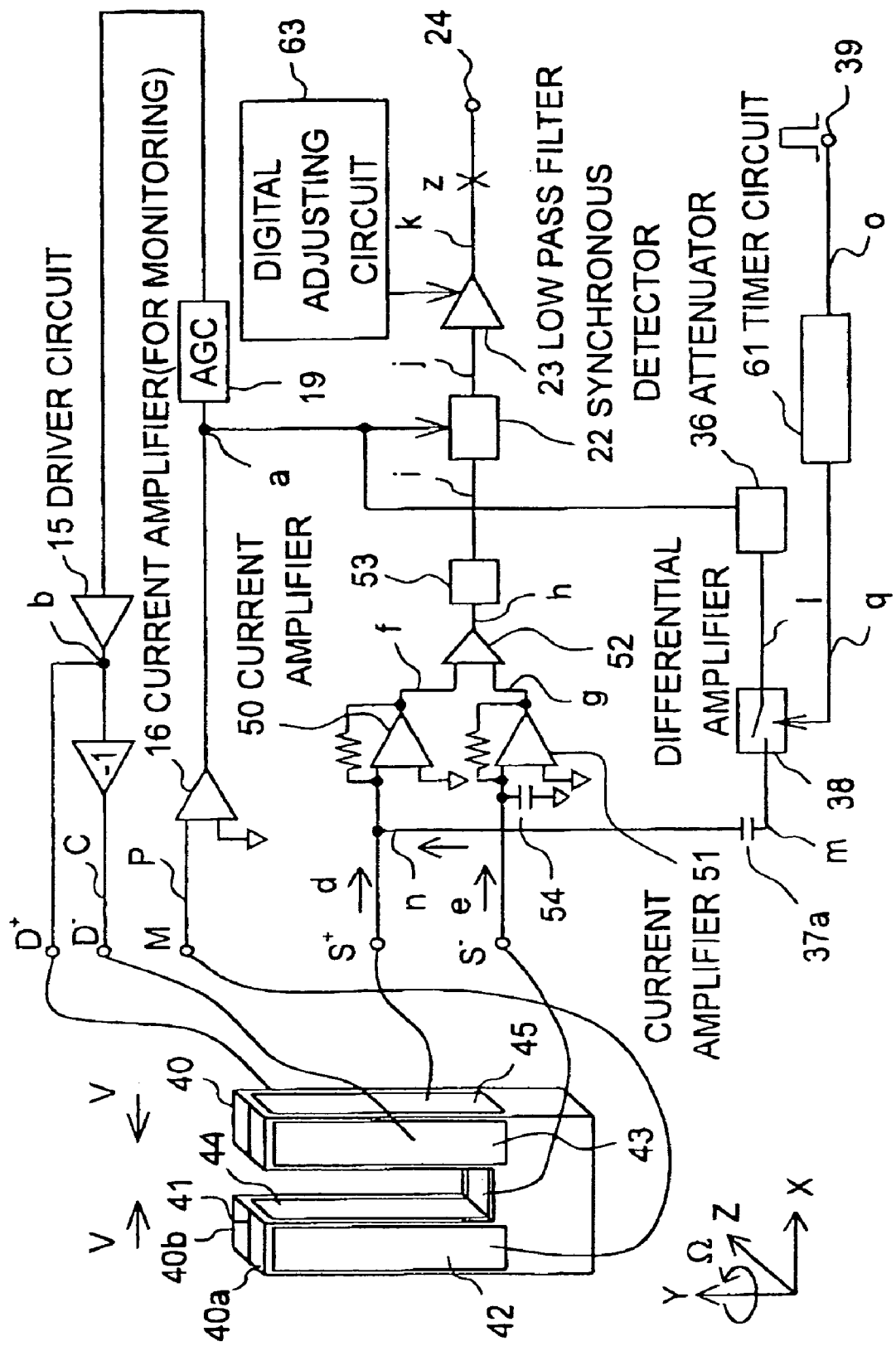
FIG. 24 is a circuit diagram of an angular velocity sensor in accordance with a tenth exemplary embodiment of the present invention.

FIG. 24 is a circuit diagram of an angular velocity sensor in accordance with a tenth exemplary embodiment of the present invention. In FIG. 24, elements which have the same function as in FIG. 20(a) are denoted by the same reference numerals and a detailed explanation thereto is omitted.

In FIG. 24, a timer circuit 61 is introduced which operates in response to the external diagnosis request signal supplied to control terminal 39. With this timer circuit 61, it becomes possible to realize various functions such as to delay, interrupt or extend the external diagnosis request signal applied to control terminal 39.

Figure 25:
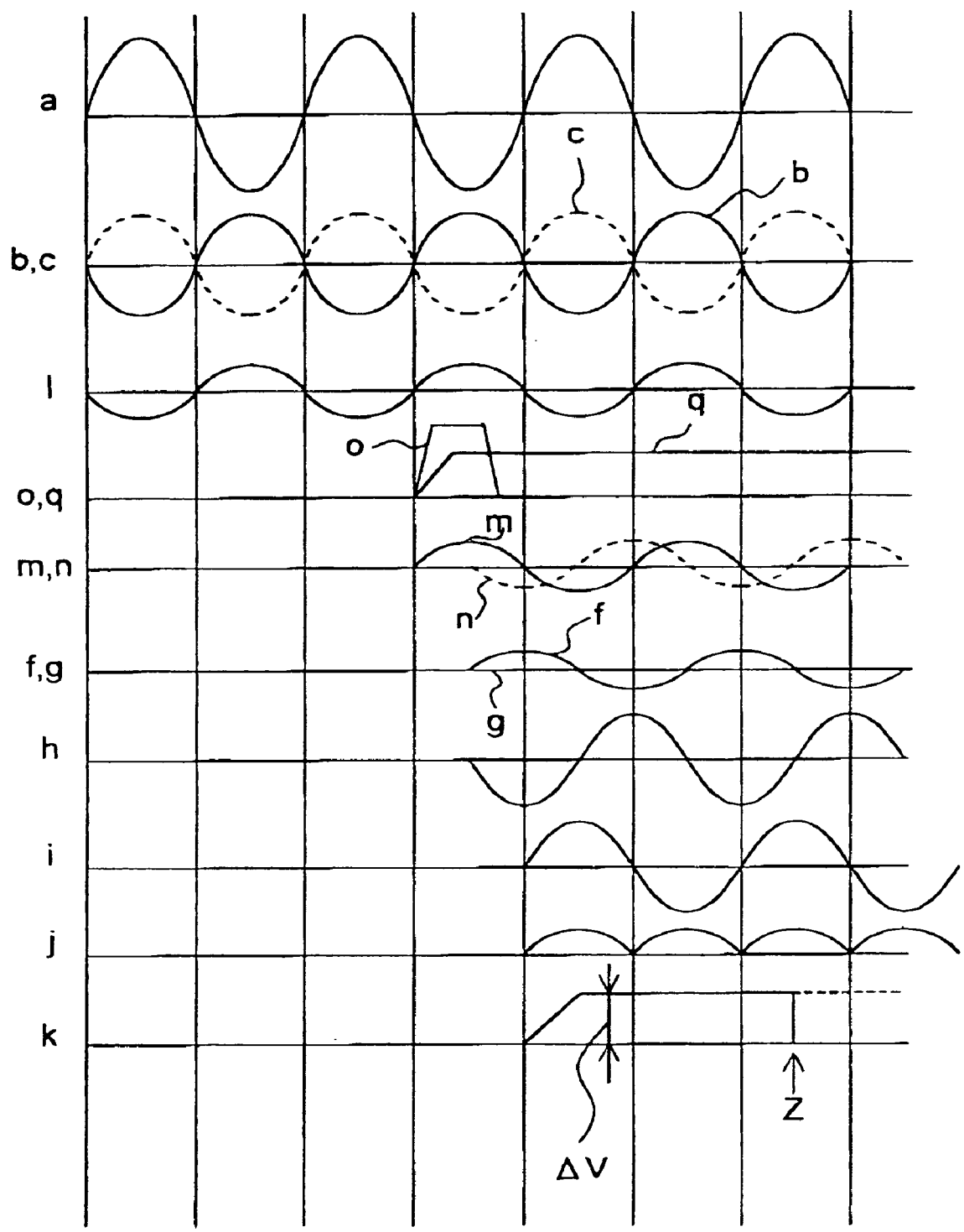
FIG. 25 shows waveforms at various points of the angular velocity sensor of FIG. 24.

Operational waveform of each part of the present angular velocity sensor shown in FIG. 24 is illustrated in FIG. 25. Each waveform shown in FIG. 25 is essentially the same as that of FIG. 21. What differs is, the pulse width length of the waveform indicated by o is shorter and the output waveform of timer circuit 61 (waveform indicated by q) is added.

Thus, by inputting short pulse external diagnosis request signal indicated by o, a long continuing signal indicated by q can be obtained, which can keep switch 38 on for a long time. Accordingly, freedom of interface design of the external control circuit can be improved.

Eleventh Exemplary Embodiment

Figure 26A:
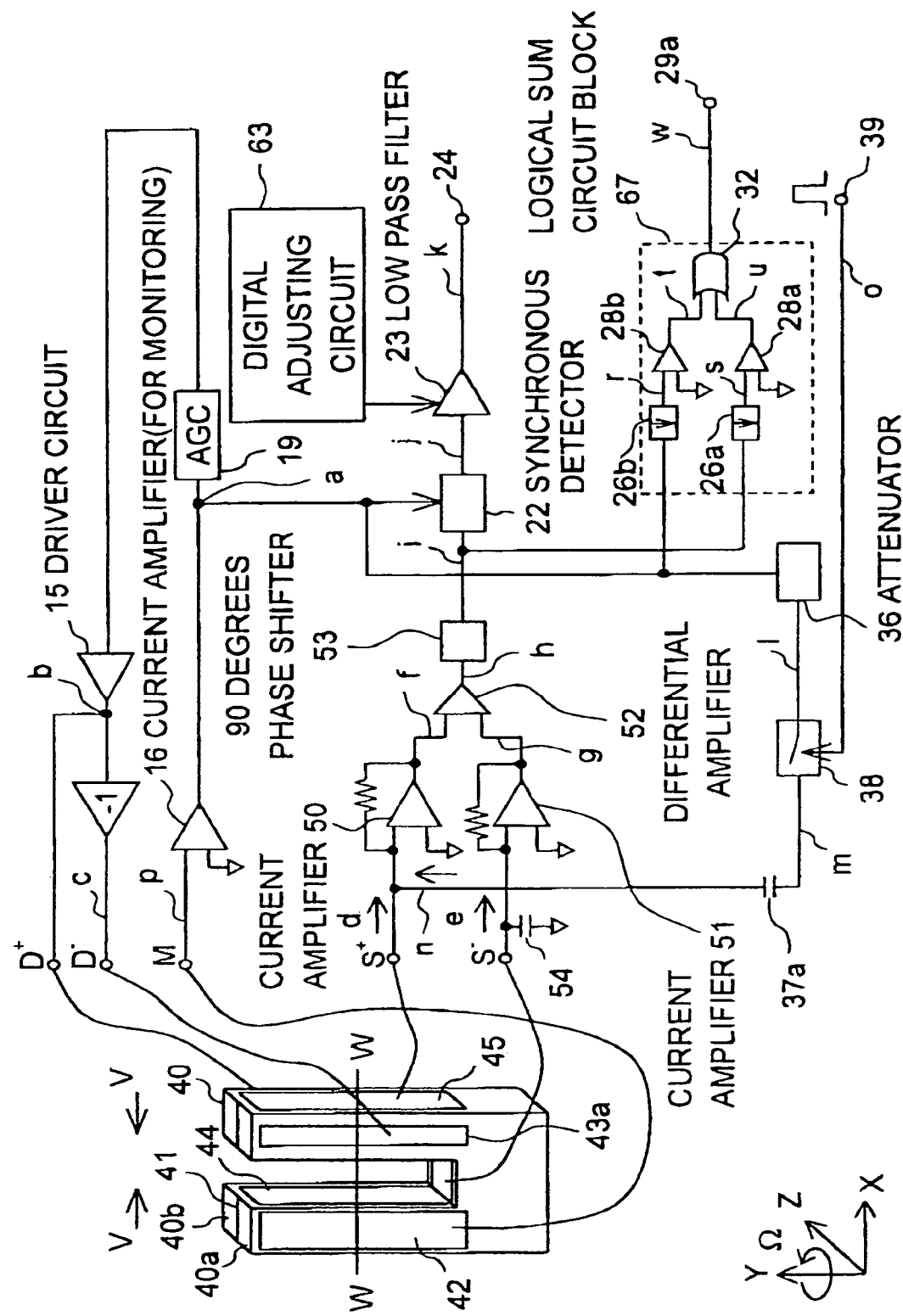
FIG. 26(*a*) is a circuit diagram of an angular velocity sensor in accordance with an eleventh exemplary embodiment of the present invention.

FIG. 26(a) is a circuit diagram of an angular velocity sensor in accordance with an eleventh exemplary embodiment of the present invention. In FIG. 26(a), elements which have the same function as in FIG. 20(a) are denoted by the same reference numerals and a detailed explanation thereto is omitted.

The width of driving electrode 43a in FIG. 26(a) is set narrower than driving electrode 43 in FIG. 20(a). Logical sum circuit block 67; which includes rectifiers 26a and 26b, comparators 28a and 28b, and logical sum circuit 32; works as a judge circuit. It always monitors the level of currents d and e outputted from sensing electrodes 45 and 44, respectively, and, if any damage of the sensor happens to occur, outputs a self diagnosis signal to diagnosis signal output terminal 29a, even if an external diagnosis request signal is not provided to control terminal 39.

Figure 27:
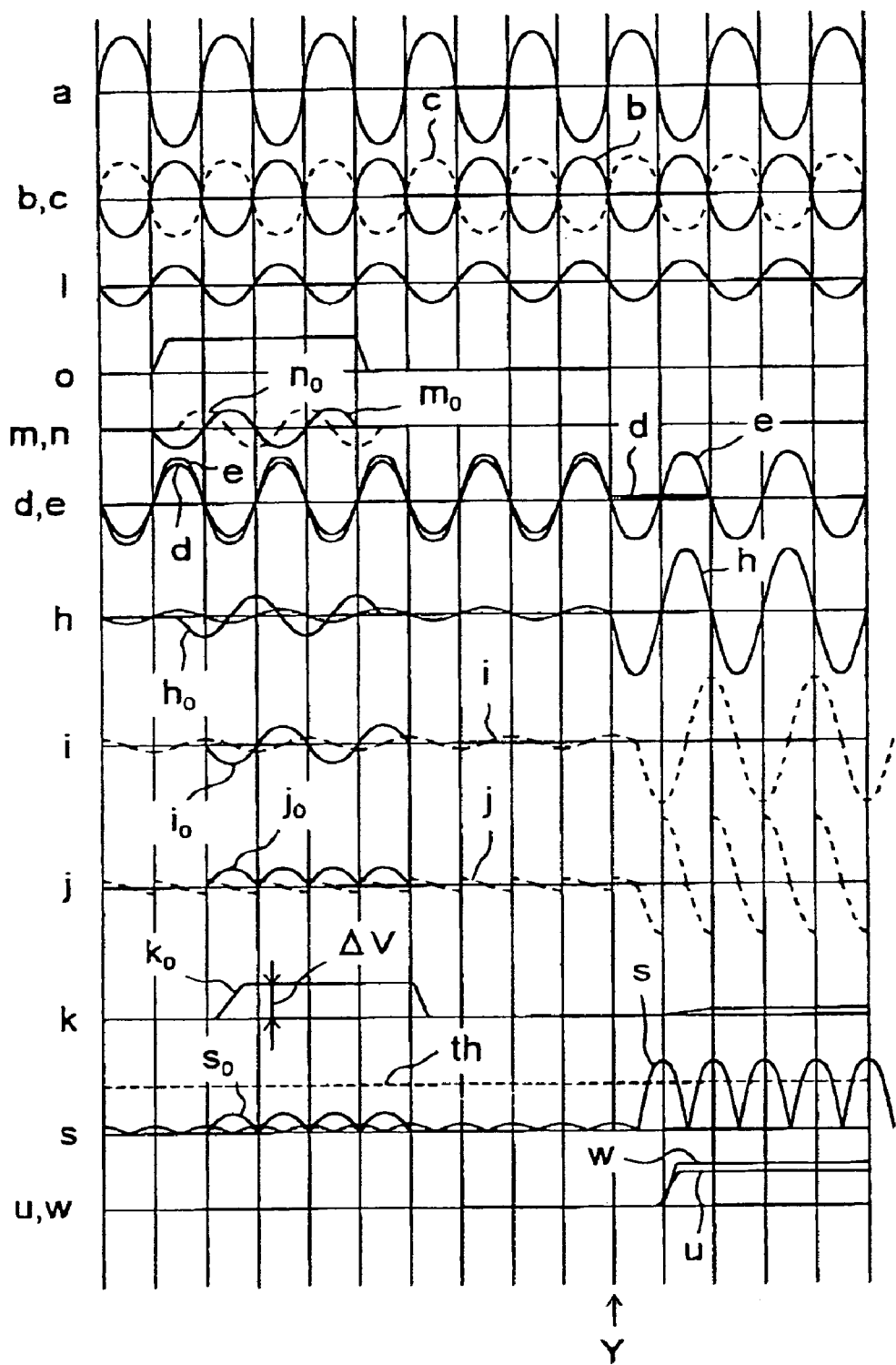
FIG. 27 shows waveforms at various points of the angular velocity sensor of FIG. 26(*a*).

Operational waveform of each part of the present angular velocity sensor shown in FIG. 26(a) is illustrated in FIG. 27. Each waveform shown in FIG. 27 is essentially the same as that of FIG. 21. What differs is that, waveforms of currents d and e outputted from sensing electrodes 45 and 44 respectively, and waveforms indicated by s, u and w are newly added.

Figure 26B:
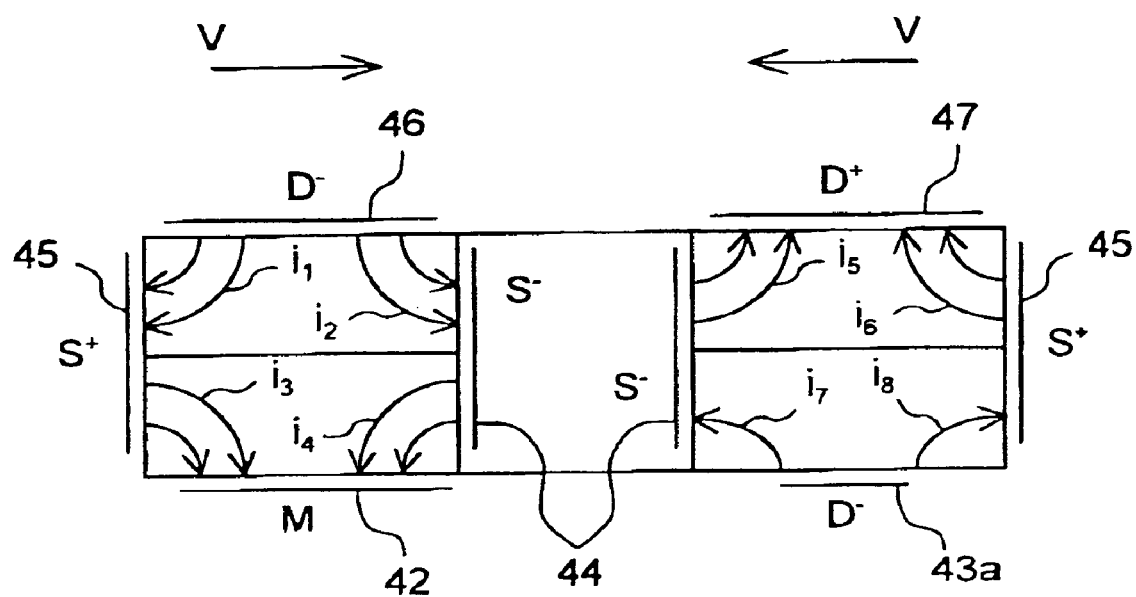

Sensor element 40 is in a tuning fork vibration along the x-axis direction with velocity V as shown in FIG. 26(a). Caused by this vibration, various currents flow between each electrode in the sensor element 40 as shown in FIG. 26(b). Currents $i_S-$ and $i_S+$, flowing at each sensing electrode 44 and 45, are expressed by formulae (7) and (8), respectively.

$$i_{S-}=i_2-i_4-i_5+i_7 \quad (7)$$

$$i_{S+}=i_1-i_3-i_6+i_8 \quad (8)$$

Because the magnitudes of $i_1$ to $i_4$ are almost the same, $i_2$ and $i_4$ cancel each other and $i_1$ and $i_3$ also cancel each other in formulae (7) and (8). But as the widths of driving electrodes 43a and 47 are different, $i_5$ is not equal to $i_7$, and $i_6$ is not equal to $i_8$. Accordingly currents $i_S-$ and $i_S+$ are finally expressed by formulae (9) and (10).

$$i_{S-}=-i_5+i_7 \quad (9)$$

$$i_{S+}=-i_6+i_8 \quad (10)$$

As magnitudes of $i_5$ and $i_6$ are almost the same and the magnitudes of $i_7$ and $i_8$ are also almost the same, the output v of differential amplifier 52 is expressed by formula (11) as long as the sensor works normally.

$$v=V(i_s+-i_s-)=0 \quad (11)$$

But when wire breakage or such abnormality occurs at point y shown in FIG. 26(a) and at a timing Y as shown in FIG. 27, current d becomes zero so that the output of differential amplifier 52 is no longer kept balanced, as shown in formula (12) (waveform indicated by h).

$$v=V(-i_S-)=V(i_5-i_7)0 \quad (12)$$

Voltage v expressed by formula (12) is inputted, via phase shifter 53, to rectifier 26a and is outputted as a rectified waveform at point s. In the logical sum circuit block 67, the waveform at point s is compared with a predetermined threshold value (th) by comparator 28a. When the waveform at point s exceeds the threshold value, comparator 28a outputs a high level shown by u. Thus, even if the external diagnosis request signal is not supplied to control terminal 39, logical sum circuit 32 outputs a high level as shown by w in FIG. 27 when any abnormality occurs in the sensor. Accordingly, abnormalities such as wire breakage or others can be detected always and instantly by watching diagnosis signal output terminal 29a. Further, in normal operation, the signal at point r (i.e., the rectified signal of the signal at point a) is set to exceed the threshold of comparator 28b, so that comparator 28b outputs a low level signal at point t. Therefore, when the monitor signal at point a is in a normal state, logical sum circuit 32 outputs a low level signal to diagnosis signal output terminal 29a. But when some abnormality in the signal at point a occurs and its value decreases below the threshold of comparator 28b, the output of comparator 28b becomes high and so logical sum circuit 32 outputs a high level signal, thus enabling detection of the abnormality. Accordingly, by introducing logical sum circuit block 67, it becomes possible to diagnose the abnormality of both the driver circuit 15 and the angular velocity detection circuit at the same time.

By adopting the aforementioned construction, it is unnecessary to provide any additional means for diagnosis such as an electrode for pseudo-driving on the sensor element 40. Also, it becomes easy to design electrodes with improved driving efficiency when a smaller size sensor element is required. Further, an angular velocity sensor with high performance of abnormality detection can be realized.

In FIG. 27, waveforms at various circuit points, when the external diagnosis request signal is inputted (waveform o), are also shown by adding a letter 0 to the name of each point (as $h_O$, $i_O$, $j_O$, $k_O$, etc.) for the sake of easier understanding. These waveforms are basically the same as shown in FIG. 21.

Twelfth Exemplary Embodiment

Figure 28B:
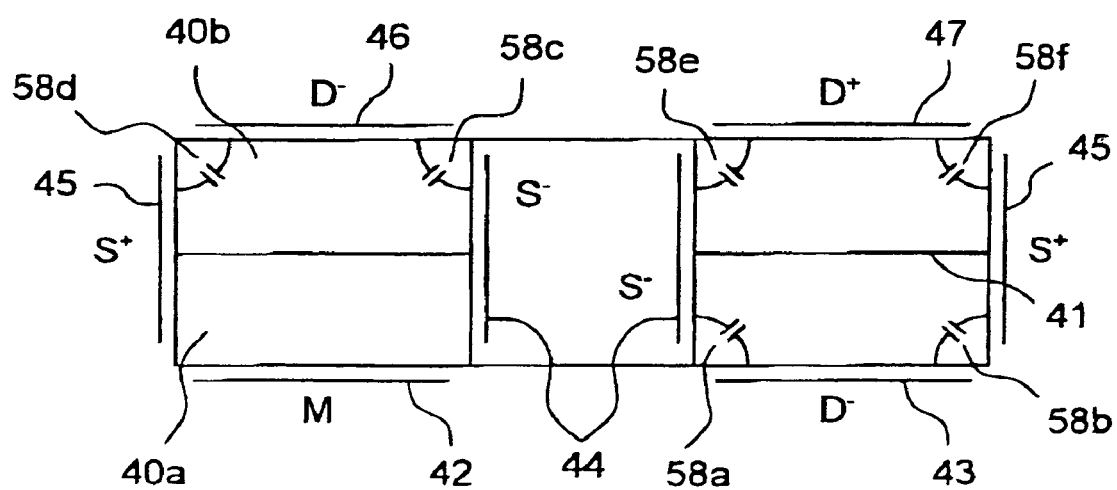
FIG. 28(*a*) is a circuit diagram of an angular velocity sensor in accordance with a twelfth exemplary embodiment of the present invention.

FIG. 28(a) is a circuit diagram of an angular velocity sensor in accordance with a twelfth exemplary embodiment of the present invention. FIG. 28(b) shows electrostatic coupling capacitances formed between each electrode in a cross section of the sensor element 40 of the present embodiment cut by the W—W plane. In FIGS. 28(a) and 28(b), elements which have the same function as in FIGS. 20(a) and 20(b) are denoted by the same reference numerals and a detailed explanation thereto is omitted.

The electrostatic coupling capacitors 58a, 58b, 58c, 58d, 58e and 58f, shown in FIG. 28(b), sometimes modify intrinsic output signals outputted from the sensor element 40 and induce an undesirable offset voltage in the output angular velocity signal. The present embodiment relates to an adjusting circuitry to eliminate such influence of the electrostatic coupling capacitors 58a, 58b, 58c, 58d, 58e and 58f.

In FIG. 28(a), a signal generator 62 generates a signal for use in the adjusting operation. In order to improve accuracy of adjusting, the frequency of the signal generated by signal generator 62 is set different from the frequency of the characteristic vibration mode of the sensor element 40 so as not to induce vibration in the sensor.

The signal generated by signal generator 62 is supplied, as a positive polarity signal, to driving electrode 47 for pseudo-driving. Also, it is inverted by driving circuit 15 and supplied to driving electrodes 43 and 44 for pseudo-driving as a negative polarity signal. Here, the pseudo-driving means provides a test signal to the sensor element 40 for an adjusting operation, without vibrating the sensor element 40.

Owing to the coupling by electrostatic coupling capacitors 58a, 58b, 58c, 58d, 58e and 58f formed between driving electrodes 43, 46 and 47, detected signals from sensor element 40 are modified. The modified signal is called a "coupled signal".

Switches 55 and 56 select the polarity of the driving signal supplied to adjustor 36a in response to the switching signal from digital adjusting circuit 63. They switch, in accordance with the polarity of the coupled signals detected at sensor element 40, the polarity of the quasi-driving voltage applied to driving electrodes 43, 46 and 47.

Switch 57 is for stopping the ordinary driving of the sensor element 40 by breaking the self-driving closed loop during the adjusting operation. Switches 60 and 66 enable canceling the unwanted signal induced by electrostatic coupling capacitors 58a, 58b, 58c, 58d, 58e and 58f by use of the signal supplied to adjustor 36a. In this action switch 66 is usually closed.

When the values of electrostatic coupling capacitors 58a, 58b, 58c, 58d, 58e and 58f are small and negligible, a more stable monitor signal (signal at point a) can be used by closing switch 60 in place of closing switch 66. By using the monitor signal, the initial value of the unwanted signal from sensor element 40 induced by electrostatic coupling capacitors 58a, 58b, 58c, 58d, 58e and 58f can be adjusted.

Terminal 65 is provided in order to monitor the pseudo-driving signal applied to sensor element 40 during the adjusting process. By using terminal 65, it becomes unnecessary to touch test probes to soldered portions, thus avoiding damaging the soldered portions. Also, it becomes possible to avoid a spurious signal being picked up by the test probe which becomes a new signal source and couples with the sensing electrodes 44 and 45 of the sensor element 40.

Digital adjusting circuit 63 supplies a control signal to adjust gain and offset of low pass filter 23, thus adjusting the output level of the present angular velocity sensor at output terminal 24. Also, digital adjusting circuit 63 digitally selects the adjusting signal by storing the adjusting amount of adjustor 36a and by controlling the switches 55, 56, 60 and 66.

Figures 29A, 29B, 29C:
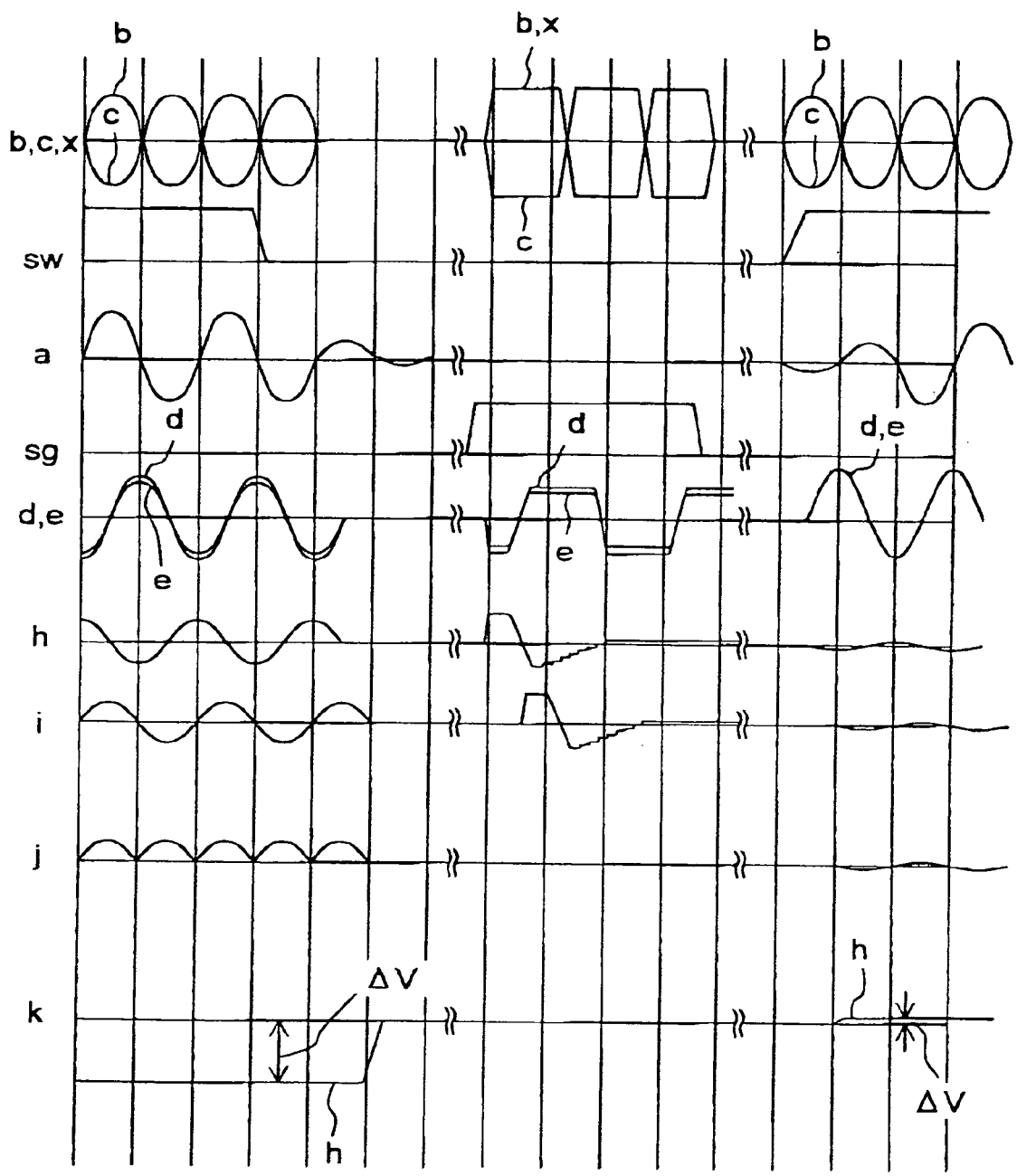
FIG. 29(*a*) shows waveforms at various points of the angular velocity sensor of FIG. 28(*a*) before an adjusting operation.

Operational waveforms of each part of the present angular velocity sensor before, during and after the adjusting operation are shown in FIGS. 29(a), 29(b) and 29(c), respectively. Each waveform shown in FIGS. 29(a), 29(b) and 29(c) is essentially the same as that of FIG. 21. What differs is that, several waveforms are modified by the on/off signal of switch 57 and by the signal from signal generator 62. The state of switch 57 is shown by waveform indicated by sw, where a high level means the switch is closed. The operational state of signal generator 62 is shown by waveform indicated by sg, where a high level means the signal generator is in operation.

Current signals d and e, shown in FIG. 29(a), are modified by electrostatic coupling capacitors 58a, 58b, 58c, 58d, 58e and 58f shown in FIG. 28(b). The capacitance value of electrostatic coupling capacitors 58a, 58b, 58c, 58d, 58e and 58f varies easily caused by differences in shape, distance and position of each electrode, and by difference in shape of the sensor element 40, resulting in a variation of the electrostatic coupling capacitors C. Current signals d and e not canceled by differential amplifier 52 induce a differential coupled current $\cdot C \cdot Vd$ (waveform at point h), where and Vd are respectively the angular frequency and amplitude of the driving voltage. This signal at point h is phase shifted by 90 degrees phase shifter 53 and is inputted to synchronous detector 22 as a signal with the same phase as the monitor signal (waveform at point a), and is finally outputted to output terminal 24 as an offset voltage V.

As the offset voltage is proportional to $\cdot C \cdot Vd$, the driving voltage is an important factor in generating the offset voltage. Because the amplitude of the driving voltage is determined automatically by the driving closed loop including sensor element 40, the driving voltage is easily affected by various factors such as a temperature dependence of the piezoelectric property of the material constructing sensor element 40. Piezoelectric property of crystal material especially shows exponential increase with temperature.

Thus, if the sensor element 40 has a non-negligible level of coupling, the offset voltage of an output of the sensor shows a non-linear temperature dependence in a higher temperature range. Accordingly compensation means becomes complicated. Also, if the characteristics of the sensor varies with time it directly generates the variation in the offset voltage and the reliability of the sensor becomes poor.

In order to prevent this offset voltage variation, the present invention introduces a test period for forcibly stopping the vibration of sensor element 40, to which quasi-driving voltages b and c are supplied from a signal generator 62. In the test period, adjustor 36a works to reduce the signal at point h or i which is proportional to the difference between two output current signals d and e induced by electrostatic coupling capacitors 58a, 58b, 58c, 58d, 58e and 58f. By doing so, the accuracy of adjusting, and as a result, the accuracy of the sensor is improved. The frequency of the quasi-driving signal from signal generator 62 may be selected to be other than the characteristic vibration frequency of the sensor element 40.

Now the process for reducing V is explained when a ladder network resistor is used as adjustor 36a and capacitor 37b is used as an injector for compensation. As shown in FIG. 29(b), quasi-driving voltage b and c with a trapezoidal waveform are generated when signal generator is in a working state. Denoting a capacitance of capacitor 37b as C and a constant of ladder network resistor used for reducing V as, the amount of adjusting signal is expressed by formula (13).

$$C \cdot Vd \qquad (13)$$

Accordingly, by adjusting so as to make the amount expressed by formula (14) zero, the waveforms at point h and point i reach zero as shown in FIG. 29(b), supposing C and C are stable against temperature.

$$C \cdot Vd - C' \cdot Vd = (C - C') \cdot Vd \qquad (14)$$

As a result, after the above-mentioned adjusting operation, the waveforms at point h, i and j become almost zero as shown in FIG. 29(c) and the offset voltage V, in which the influence of driving voltage Vd is suppressed, is outputted to output terminal 24.

By integrating capacitor 37b into a semiconductor integrated circuit together with other circuit blocks, portions connected by soldering are reduced and the reliability of the sensor is further improved.

During the adjusting period, is usually determined so as to adjust the signal level (at point i) of terminal 64 to zero, by monitoring the pseudo-driving signal at terminal 65 and the signal at terminal 64 using an oscilloscope or the like. The adjustment is performed by successively sending digital data to the ladder network resistor and finding the optimum digital data that gives zero differential voltage at terminal 64 induced by the current signal d and e. The obtained optimum digital data is stored in a memory such as ROM. Thus, a highly accurate sensor, in which the influence of the electrostatic coupling capacitors 58a, 58b, 58c, 58d, 58e and 58f is suppressed in a normal operating condition, can be obtained.

Although in this exemplary embodiment only the case in which the offset voltage V at output terminal 24 is set to infinitesimally zero by adjusting is explained, it is also possible to set the offset voltage V to a non-zero definite value by adjusting. Also, by using a temperature sensitive device as the ladder network resistor and capacitor 37b, it is possible to perform the adjusting so as to include temperature compensation.

Although in this exemplary embodiment explanation is made only for crystal or quartz as a sensor element 40, it is also possible to use piezoelectric ceramics, silicon, or the combination of silicon and piezoelectric film as the vibrator material.

Also, although the construction of the present invention with respect to the eighth through twelfth exemplary embodiments was described using a current amplifier, differential amplifier, phase shifter and synchronous detector, the present invention is not limited to this construction. In particular, any synchronous demodulator that can synchronously detect the output of a differential amplifier and outputs the angular velocity signal, such as the circuit block combining a detector and phase shifter, can be used.

Thirteenth Exemplary Embodiment

Figure 30:
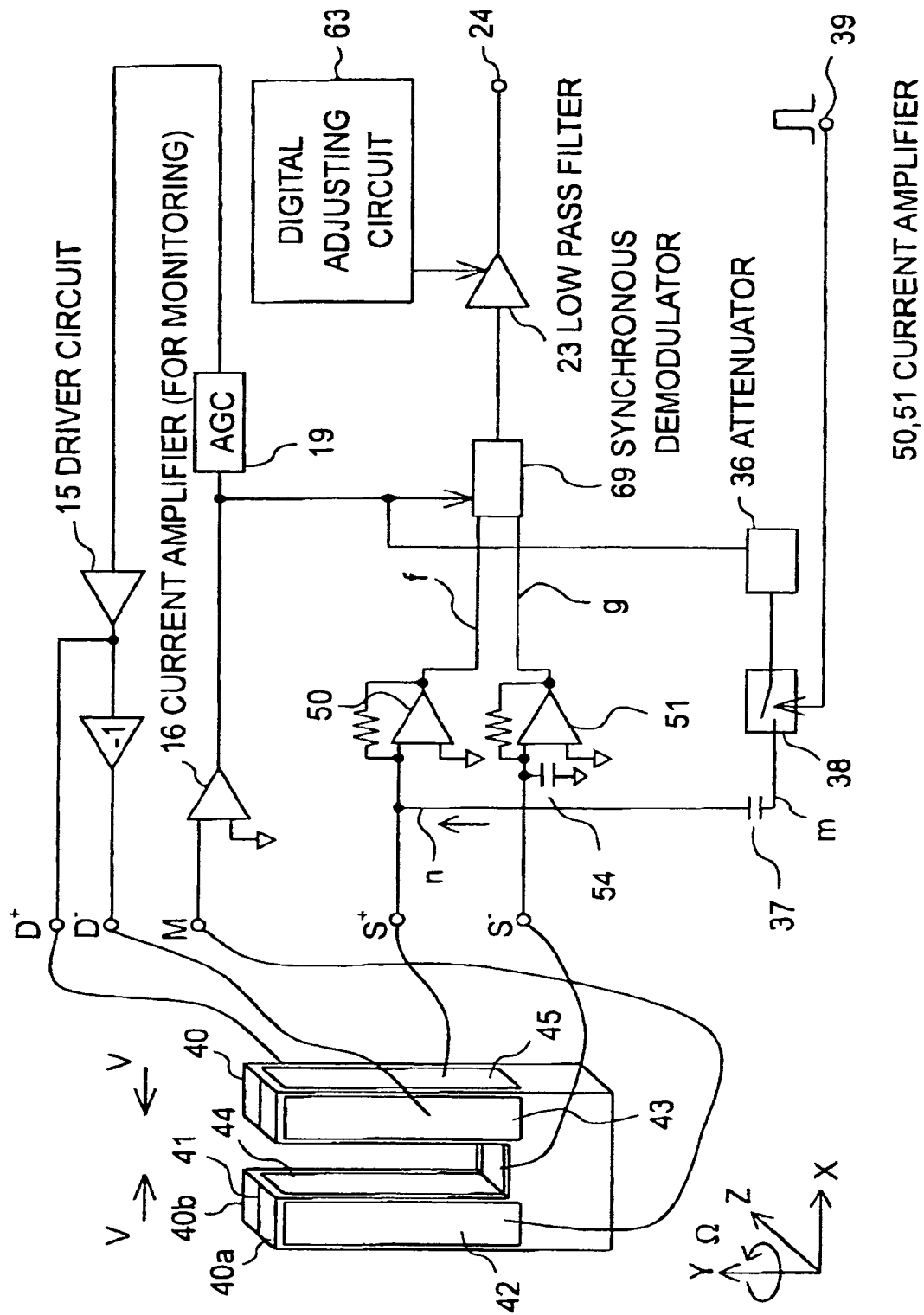
FIG. 30 is a circuit diagram of an angular velocity sensor in accordance with a thirteenth exemplary embodiment of the present invention.

FIG. 30 is a circuit diagram of an angular velocity sensor in accordance with a thirteenth exemplary embodiment of the present invention. In FIG. 30, elements which have the same function as in FIG. 20(a) are denoted by the same reference numerals and a detailed explanation thereto is omitted.

In FIG. 30, synchronous demodulator 69 shifts the phase of the difference of the outputs of current amplifiers 50 and 51 by 90 degrees, then sample-holds the shifted signal, and finally synchronously detects the sample-held signal. As synchronous demodulator 69 contains the sample-hold function, saturation of the circuit caused by excessive unwanted signals generated in sensor element 40 can be avoided.

Although in this exemplary embodiment, explanation is made on the synchronous demodulator including a 90 degrees phase shifter, sample-holder, and synchronous detector, the present invention is not limited to this construction. Any circuit block which functions for the same purpose can be used instead.

Thus, an angular velocity sensor of the present invention can detect from a state of the mechanical coupling signal whether the angular velocity signal is in a state which can perform a correct detection or not. Moreover, because the mechanical coupling signal is always generated, it is unnecessary to provide independent means for generating the mechanical coupling signal and the composition of the sensor becomes very simple and highly reliable for self diagnosis.

What is claimed is:

1. An angular velocity sensor comprising:
   a sensor element including a driver part and a detector part for detecting an angular velocity;
   a driver circuit for supplying a driving signal to the driver part of said sensor element, wherein a monitor signal is output from said sensor element and coupled to said driver circuit;
   a detection unit including a charging amplifier and a synchronous detector, wherein an output from the detector part of said sensor element is applied to said charging amplifier, and wherein said synchronous detector receives both a signal synchronized with said driving signal and an output of said charging amplifier, said detection unit outputting an angular velocity signal; and
   a self diagnosis unit for detecting an abnormality of said sensor element and outputting a self diagnosis signal by coupling said signal synchronized with said driving signal to an input of said synchronous detector,
   wherein said self diagnosis unit comprises:
   an attenuator for attenuating the signal synchronized with said driving signal and
   a capacitor injecting the signal synchronized with said driving signal from said attenuator to a circuit, said circuit having an output coupled to said synchronous detector.

2. An angular velocity sensor comprising:
   a sensor element including a vibrator and a detector for detecting an angular velocity;
   a drive unit including a driver circuit and a monitor circuit, wherein said driver circuit supplies a driving signal to the vibrator of said sensor element, and said monitor circuit receives a monitor signal from said sensor element;
   a detection unit including a pair of current amplifiers, a differential amplifier, a phase shifter and a synchronous detector, wherein said pair of current amplifiers receive outputs from the detector of said sensor element, said differential amplifier amplifies the difference of outputs from said pair of current amplifier, said phase shifter shifts the phase of an output of said differential amplifier by 90 degrees, and said synchronous detector detects an output from said phase shifter in synchronous with the monitor signal of said drive unit and outputs an angular velocity signal; and a self diagnosis unit for outputting a diagnosis signal to detect an abnormality of at least one of said sensor element, said detection unit and said drive unit, by providing a displacement signal synchronized with said monitor signal to said detection unit.

3. An angular velocity sensor according to claim 2, wherein said self diagnosis unit comprises an attenuator for attenuating said monitor signal to generate said displacement signal, and an injector for providing said displacement signal from said attenuator to said detection unit.

4. An angular velocity sensor according to claim 3, further including a changing unit for changing said self diagnosis unit to either a working state or a non-working state, said changing unit being disposed between said attenuator and said injector.

5. An angular velocity sensor according to claim 4, further including a judge unit for continuously judging an abnormality of one of said sensor element, said detection unit and said drive unit, by detecting an output level of said detection unit during the non-working state of said self diagnosis unit.

6. An angular velocity according to claim 4, wherein said changing unit is a switch for connecting or disconnecting, in accordance with an external control mechanism, said displacement signal to said injector.

7. An angular velocity sensor according to claim 4, wherein said changing circuit unit comprises a timer circuit for connecting or disconnecting for a given time, in accordance with an external control mechanism, said a displacement signal to said injector.

8. An angular velocity sensor according to claim 3, wherein said injector comprises a capacitor.

9. An angular velocity sensor according to claim 3, wherein said injector comprises a resistor.

10. An angular velocity sensor according to claim 3, wherein said attenuator includes a ladder network resistor capable of digitally adjusting at least one of an amplitude and phase of an input signal.

11. An angular velocity sensor according to claim 3, further including a balancing unit, wherein said balancing unit is disposed at an input terminal of one of said pair of current amplifiers and said input terminal is not connected to said injector, whereby said balancing unit maintains a balance of input characteristics between each of said pair of current amplifiers.

* * * * *